US012381048B2

(12) United States Patent
Chen

(10) Patent No.: US 12,381,048 B2
(45) Date of Patent: Aug. 5, 2025

(54) TRANSPARENT KEY MODULE AND CONTROL DEVICE WITH SAME

(71) Applicant: Primax Electronics Ltd., Taipei (TW)

(72) Inventor: Bo-An Chen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 97 days.

(21) Appl. No.: 18/233,048

(22) Filed: Aug. 11, 2023

(65) Prior Publication Data

US 2025/0014849 A1 Jan. 9, 2025

(30) Foreign Application Priority Data

Jul. 5, 2023 (TW) .................................. 112125159

(51) Int. Cl.
*H01H 13/83* (2006.01)
*G06F 3/02* (2006.01)
*H01H 13/705* (2006.01)

(52) U.S. Cl.
CPC ............. *H01H 13/83* (2013.01); *G06F 3/021* (2013.01); *H01H 13/705* (2013.01)

(58) Field of Classification Search
CPC ........... H01H 2013/00; H01H 2013/02; H01H 2013/023; H01H 2013/50; H01H 2013/52; H01H 2003/052; H01H 2003/056; H01H 2215/02; H01H 2003/00; H01H 2003/007; H01H 2003/02; H01H 2003/12; H01H 2009/02; H01H 2009/0214; H01H 2009/16; H01H 2009/18; H01H 2009/182; H01H 2009/186; H01H 2009/20; H01H 2009/28; H01H 9/00; H01H 9/02; H01H 9/0214; H01H 9/0235; H01H 9/0242; H01H 9/16; H01H 9/20; H01H 9/22; H01H 9/24; H01H 9/26; H01H 9/28; H01H 2001/50; H01H 13/00; H01H 13/02; H01H 13/04; H01H 13/10; H01H 13/12; H01H 13/14; H01H 13/83; H01H 13/70; H01H 13/7006; H01H 13/7013; H01H 13/702; H01H 13/703; H01H 13/704; H01H 13/705; H01H 3/00; H01H 3/12; G06F 3/021; G06F 3/02

See application file for complete search history.

(56) References Cited

U.S. PATENT DOCUMENTS

| | | | | |
|---|---|---|---|---|
| 5,500,497 A | * | 3/1996 | Merriman | H01H 13/702 200/310 |
| 2014/0014488 A1 | * | 1/2014 | Tsai | H01H 13/88 200/5 A |
| 2014/0166459 A1 | * | 6/2014 | Armendariz | H01H 13/88 264/238 |

* cited by examiner

*Primary Examiner* — Anthony R Jimenez
(74) *Attorney, Agent, or Firm* — KIRTON McCONKIE; Evan R. Witt

(57) ABSTRACT

A see-through key module includes plural keycaps, an elastic member, a switch circuit and a base plate. The elastic member includes plural support parts, plural lateral parts and a lower part. The lower part includes a connecting region and a periphery region. The plural lateral parts are installed on the connecting region of the lower part. The periphery region is arranged around the connecting region. The periphery region of the lower part includes at least one positioning recess. The switch circuit is located under the elastic member. The base plate is located under the switch circuit. The base plate includes at least one hook. The at least one hook is penetrated upwardly through the switch circuit and inserted into the corresponding positioning recess. Consequently, the switch circuit is fixed between the elastic member and the base plate.

21 Claims, 16 Drawing Sheets

TRANSPARENT KEY MODULE AND CONTROL DEVICE WITH SAME

FIELD OF THE INVENTION

The present invention relates to a transparent key module and a control device with the see transparent key module, and more particularly to a control device with a transparent key module, in which the transparent key module is located over a display panel for providing tactile feel like a physical key and allowing a graphic image shown on the display panel to be completely exposed.

BACKGROUND OF THE INVENTION

Nowadays, a control device is usually equipped with a transparent key module. The transparent key module is a stack structure of plural layers. Since the thicknesses of these layers in the transparent key module are usually inconsistent, the transparent key module is readily suffered from depression when pressed. In other words, the pressing action is not well confirmed. Moreover, the depressed components may also cause interference patterns on the underlying display panel, and even cause damage to the display component of the display panel. Therefore, the design of the conventional transparent key module needs to be improved.

Furthermore, there is a lack of an alignment design between different layers of components in the transparent key module. Consequently, during the assembling process of the transparent key module, the position deviation problem occurs. Due to the position deviation problem, the transparent key module cannot be well aligned with the graphic image on the display panel. Consequently, the user's operating experience and evaluation for the control device are adversely affected. Therefore, it is important to provide an improved transparent key module in order to overcome the drawbacks of the conventional technologies.

SUMMARY OF THE INVENTION

In order to overcome the drawbacks of the conventional technologies, the present invention provides a transparent key module. The transparent key module includes a top cover, a switch circuit, an elastic member, a contact point layer and a base plate. The base plate is arranged between the switch circuit and a display panel. The bottom side of the switch circuit is supported by the base plate. Consequently, the switch circuit can be effectively triggered, and the transparent key module will not be readily suffered from depression. Due to the cooperation of a hook of the base plate and a positioning recess of the elastic member, the contact point layer and the switch circuit are clamped between the top cover and the base plate and aligned. Furthermore, the elastic member, the contact point layer and the switch circuit are clamped and fixed between the top cover and the base plate. Consequently, the whole transparent key module can be assembled.

In accordance with an aspect of the present invention, a transparent key module is provided. The transparent key module includes plural keycaps, an elastic member, a switch circuit and a base plate. The elastic member includes plural support parts, plural lateral parts and a lower part. Each of the plural support parts is connected with the corresponding keycap. Each of the plural lateral parts is arranged between the corresponding support part and the lower part. The lower part includes a connecting region and a periphery region. The plural lateral parts are installed on the connecting region of the lower part. The periphery region is arranged around the connecting region. The periphery region of the lower part includes at least one positioning recess. The switch circuit is located under the elastic member. The base plate is located under the switch circuit. The base plate includes at least one hook. The at least one hook is penetrated upwardly through the switch circuit and inserted into the corresponding positioning recess. Consequently, the switch circuit is fixed between the elastic member and the base plate.

In an embodiment, each of the plural support parts, the corresponding lateral part and the lower part in the elastic member from top to bottom are collaboratively formed as a crater-shaped structure. Moreover, a central portion the crater-shaped structure has a hollow chamber.

In an embodiment, the hollow chamber includes a first opening and a second opening. The first opening and the second opening are respectively located at two opposite ends of the hollow chamber. The first opening is located near the corresponding keycap. The second opening is located near the switch circuit.

In an embodiment, the switch circuit includes an upper membrane layer, a lower membrane layer and a spacer structure. The upper membrane layer includes a top surface, plural light-transmissible openings and a bottom surface. The plural light-transmissible openings of the upper membrane layer run through the top surface of the upper membrane layer and the bottom surface of the upper membrane layer. The lower membrane layer includes a top surface, plural light-transmissible openings and a bottom surface. The plural light-transmissible openings of the lower membrane layer run through the top surface of the lower membrane layer and the bottom surface of the lower membrane layer. The bottom surface of the upper membrane layer faces the lower membrane layer. The top surface of the lower membrane layer faces the upper membrane layer. The spacer structure is arranged between the bottom surface of the upper membrane layer and the top surface of the lower membrane layer. The upper membrane layer and the lower membrane layer are separated from each other by the spacer structure. Moreover, at least one first circuit contact point is formed on the bottom surface of the upper membrane layer, and at least one second circuit contact point is formed on the top surface of the lower membrane layer. The at least one first circuit contact point on the upper membrane layer and the corresponding second circuit contact point on the lower membrane layer are overlapped with each other along a vertical direction. The at least one first circuit contact point on the upper membrane layer and the corresponding second circuit contact point on the lower membrane layer are separated from each other by the spacer structure. The at least one first circuit contact point on the upper membrane layer is located near the corresponding light-transmissible opening of the upper membrane layer. The second circuit contact point on the lower membrane layer is located near the corresponding light-transmissible opening of the lower membrane layer. A size of each light-transmissible opening of the upper membrane layer is smaller than a size of the second opening of the corresponding crater-shaped structure. A size of each light-transmissible opening of the lower membrane layer is smaller than the size of the second opening of the corresponding crater-shaped structure. While one of the plural keycaps is pressed down, the corresponding support part of the elastic member or the keycap is penetrated downwardly through the second opening of the corresponding crater-shaped structure to press the upper membrane layer. Consequently, the corresponding first circuit contact point on the upper membrane layer is contacted with the corresponding second circuit contact point on the lower membrane layer.

In an embodiment, the base plate includes a top surface, at least one light-transmissible opening and a bottom surface. The top surface of the base plate faces the lower membrane layer. The at least one light-transmissible opening of the base plate runs through the top surface of the base plate and the bottom surface of the base plate. A size of each light-transmissible opening of the base plate is smaller than or equal to the size of the corresponding light-transmissible opening of the lower membrane layer. The at least one light-transmissible opening of the base plate is aligned with the corresponding light-transmissible opening of the lower membrane layer along the vertical direction. When the corresponding first circuit contact point on the upper membrane layer is contacted with the corresponding second circuit contact point on the lower membrane layer, the lower membrane layer is supported by the top surface of the base plate.

In an embodiment, the switch circuit includes an upper membrane layer, a lower membrane layer and a spacer structure. The upper membrane layer includes a top surface, at least one first positioning hole and a bottom surface. The at least one first positioning hole of the upper membrane layer runs through the top surface of the upper membrane layer and the bottom surface of the upper membrane layer. The lower membrane layer includes a top surface, at least one first positioning hole and a bottom surface. The at least one first positioning hole of the lower membrane layer runs through the top surface of the lower membrane layer and the bottom surface of the lower membrane layer. The bottom surface of the upper membrane layer faces the lower membrane layer. The top surface of the lower membrane layer faces the upper membrane layer. The spacer structure is arranged between the bottom surface of the upper membrane layer and the top surface of the lower membrane layer. The upper membrane layer and the lower membrane layer are separated from each other by the spacer structure. After the at least one hook of the base plate is penetrated upwardly through the corresponding first positioning hole of the lower membrane layer and the corresponding first positioning hole of the upper membrane layer sequentially, the at least one hook is inserted into the corresponding positioning recess.

In an embodiment, the at least one positioning recess includes two positioning recesses, and the two positioning recesses are respectively located at two opposite sides of the periphery region of the elastic member. The at least one hook includes two hooks, and the two hooks are respectively located at two opposite sides of the base plate. The switch circuit includes an upper membrane layer, a lower membrane layer and a spacer structure. The upper membrane layer includes a top surface, two first positioning holes and a bottom surface. The two first positioning holes of the upper membrane layer run through the top surface of the upper membrane layer and the bottom surface of the upper membrane layer. The lower membrane layer includes a top surface, two first positioning holes and a bottom surface. The two first positioning holes of the lower membrane layer run through the top surface of the lower membrane layer and the bottom surface of the lower membrane layer. The bottom surface of the upper membrane layer faces the lower membrane layer. The top surface of the lower membrane layer faces the upper membrane layer. The spacer structure is arranged between the bottom surface of the upper membrane layer and the top surface of the lower membrane layer. The upper membrane layer and the lower membrane layer are separated from each other by the spacer structure. After the two hooks of the base plate are respectively penetrated upwardly through the corresponding first positioning holes of the lower membrane layer and the corresponding first positioning holes of the upper membrane layer sequentially, the two hooks are inserted into the corresponding positioning recesses.

In an embodiment, the transparent key module further includes a top cover. The top cover is located over the connecting region of the lower part of the elastic member. The top cover includes a connecting frame and plural perforations. The plural perforations are respectively aligned with the plural keycaps. The plural keycap are exposed outside the corresponding perforations. The connecting frame includes a top surface and a bottom surface. The plural perforations run through the top surface of the connecting frame and the bottom surface of the connecting frame. The top cover further includes at least one protrusion post. The at least one protrusion post is protruded downwardly from the bottom surface of the connecting frame.

In an embodiment, the connecting region of the elastic member includes at least one positioning hole. The switch circuit includes an upper membrane layer, a lower membrane layer and a spacer structure. The upper membrane layer includes a top surface, at least one second positioning hole and a bottom surface. The at least one second positioning hole of the upper membrane layer runs through the top surface of the upper membrane layer and the bottom surface of the upper membrane layer. The lower membrane layer includes a top surface, at least one second positioning hole and a bottom surface. The at least one second positioning hole of the lower membrane layer runs through the top surface of the lower membrane layer and the bottom surface of the lower membrane layer. The bottom surface of the upper membrane layer faces the lower membrane layer. The top surface of the lower membrane layer faces the upper membrane layer. The spacer structure is arranged between the bottom surface of the upper membrane layer and the top surface of the lower membrane layer. The upper membrane layer and the lower membrane layer are separated from each other by the spacer structure. The base plate includes a top surface, at least one positioning hole and a bottom surface. The top surface of the base plate faces the lower membrane layer. The at least one positioning hole of the base plate runs through the top surface of the base plate and the bottom surface of the base plate. After the at least one protrusion post of the top cover is downwardly penetrated through the corresponding positioning hole of connecting region of the elastic member, the corresponding second positioning hole of the upper membrane layer and the corresponding second positioning hole of the lower membrane layer sequentially, the at least one protrusion post is inserted into the corresponding positioning hole of the base plate. Consequently, the elastic member and the switch circuit are clamped between the top cover and the base plate.

In an embodiment, after the at least one protrusion post of the top cover is inserted into the corresponding positioning hole of the base plate, a sealing glue is formed around the protrusion post.

In an embodiment, after the at least one protrusion post of the top cover is inserted into the corresponding positioning hole of the base plate, a riveting head is formed at an end of the protrusion post through a riveting process.

In accordance with another aspect of the present invention, a transparent key module is provided. The transparent key module includes plural keycaps, an elastic member, a contact point layer, a switch circuit and a base plate. The elastic member includes plural support parts, plural lateral parts and a lower part. Each of the plural support parts is connected with the corresponding keycap. Each of the plural lateral parts is arranged between the corresponding support part and the lower part. The lower part includes a connecting region and a periphery region. The plural lateral parts are installed on the connecting region of the lower part. The periphery region is arranged around the connecting region. The periphery region of the lower part includes at least one positioning recess. The contact point layer is located under the elastic member. The switch circuit is located under the contact point layer. The base plate is located under the switch circuit. The base plate includes at least one hook. The at least one hook is penetrated upwardly through the switch circuit and the contact point layer and inserted into the corresponding positioning recess. Consequently, the contact point layer and the switch circuit are fixed between the elastic member and the base plate.

In an embodiment, each of the plural support parts, the corresponding lateral part and the lower part in the elastic member from top to bottom are collaboratively formed as a crater-shaped structure. A central portion the crater-shaped structure has a hollow chamber. The hollow chamber includes a first opening and a second opening. The first opening and the second opening are respectively located at two opposite ends of the hollow chamber. The first opening is located near the corresponding keycap. The second opening is located near the contact point layer.

In an embodiment, the contact point layer includes a top surface, plural light-transmissible openings, a bottom surface and at least one bump structure. The at least one bump structure of the contact point layer is formed on the top surface of the contact point layer. The at least one bump structure of the contact point layer is located near the corresponding light-transmissible opening of the contact point layer. The plural light-transmissible openings of the contact point layer run through the top surface of the contact point layer and the bottom surface of the contact point layer. The switch circuit includes an upper membrane layer, a lower membrane layer and a spacer structure. The upper membrane layer includes a top surface, plural light-transmissible openings and a bottom surface. The plural light-transmissible openings of the upper membrane layer run through the top surface of the upper membrane layer and the bottom surface of the upper membrane layer. The bottom surface of the contact point layer faces the upper membrane layer. The lower membrane layer includes a top surface, plural light-transmissible openings and a bottom surface. The plural light-transmissible openings of the lower membrane layer run through the top surface of the lower membrane layer and the bottom surface of the lower membrane layer. The bottom surface of the upper membrane layer faces the lower membrane layer. The top surface of the lower membrane layer faces the upper membrane layer. The spacer structure is arranged between the bottom surface of the upper membrane layer and the top surface of the lower membrane layer. The upper membrane layer and the lower membrane layer are separated from each other by the spacer structure. Moreover, at least one first circuit contact point is formed on the bottom surface of the upper membrane layer, and at least one second circuit contact point is formed on the top surface of the lower membrane layer. The at least one first circuit contact point on the upper membrane layer and the corresponding second circuit contact point on the lower membrane layer are overlapped with each other along a vertical direction. The at least one first circuit contact point on the upper membrane layer and the corresponding second circuit contact point on the lower membrane layer are separated from each other by the spacer structure. The at least one first circuit contact point on the upper membrane layer is located near the corresponding light-transmissible opening of the upper membrane layer. The at least one second circuit contact point on the lower membrane layer is located near the corresponding light-transmissible opening of the lower membrane layer. A size of each light-transmissible opening of the upper membrane layer is smaller than a size of the second opening of the corresponding crater-shaped structure. A size of each light-transmissible opening of the lower membrane layer is smaller than the size of the second opening of the corresponding crater-shaped structure. While one of the plural keycaps is pressed down, the corresponding support part of the elastic member or the keycap is penetrated downwardly through the second opening of the corresponding crater-shaped structure to press the corresponding bump structure of the contact point layer, and the upper membrane layer is pressed by the corresponding bump structure of the contact point layer. Consequently, the corresponding first circuit contact point on the upper membrane layer is contacted with the corresponding second circuit contact point on the lower membrane layer.

In an embodiment, the base plate includes a top surface, at least one light-transmissible opening and a bottom surface. The top surface of the base plate faces the lower membrane layer. The at least one light-transmissible opening of the base plate runs through the top surface of the base plate and the bottom surface of the base plate. A size of each light-transmissible opening of the base plate is smaller than or equal to the size of the corresponding light-transmissible opening of the lower membrane layer. The at least one light-transmissible opening of the base plate is aligned with the corresponding light-transmissible opening of the lower membrane layer along the vertical direction. When the corresponding first circuit contact point on the upper membrane layer is contacted with the corresponding second circuit contact point on the lower membrane layer, the lower membrane layer is supported by the top surface of the base plate.

In an embodiment, the contact point layer includes a top surface, at least one first positioning hole, a bottom surface and at least one bump structure. The at least one bump structure of the contact point layer is formed on the top surface of the contact point layer. The at least one positioning hole of the contact point layer runs through the top surface of the contact point layer and the bottom surface of the contact point layer. The switch circuit includes an upper membrane layer, a lower membrane layer and a spacer structure. The upper membrane layer includes a top surface, at least one first positioning hole and a bottom surface. The at least one first positioning hole of the upper membrane layer runs through the top surface of the upper membrane layer and the bottom surface of the upper membrane layer. The bottom surface of the contact point layer faces the upper membrane layer. The lower membrane layer includes a top surface, at least one first positioning hole and a bottom surface. The at least one first positioning hole runs through the top surface of the lower membrane layer and the bottom surface of the lower membrane layer. The bottom surface of the upper membrane layer faces the lower membrane layer. The top surface of the lower membrane layer faces the upper membrane layer. The spacer structure is arranged between the bottom surface of the upper membrane layer and the top surface of the lower membrane layer. The upper membrane layer and the lower membrane layer are separated from each other by the spacer structure. After the at least one hook of the base plate is penetrated upwardly through the corresponding first positioning hole of the lower membrane layer, the corresponding first positioning hole of the upper membrane layer and the corresponding first positioning hole of the contact point layer sequentially, the at least one hook is inserted into the corresponding positioning recess.

In an embodiment, the at least one positioning recess includes two positioning recesses, and the two positioning recesses are respectively located at two opposite sides of the periphery region of the elastic member. The at least one hook includes two hooks, and the two hooks are respectively located at two opposite sides of the base plate. The contact point layer includes a top surface, two first positioning holes, a bottom surface and at least one bump structure. The at least one bump structure of the contact point layer is formed on the top surface of the contact point layer. The two first positioning holes of the contact point layer run through the top surface of the contact point layer and the bottom surface of the contact point layer. The switch circuit includes an upper membrane layer, a lower membrane layer and a spacer structure. The upper membrane layer includes a top surface, two first positioning holes and a bottom surface. The two first positioning holes of the upper membrane layer run through the top surface of the upper membrane layer and the bottom surface of the upper membrane layer. The bottom surface of the contact point layer faces the upper membrane layer. The lower membrane layer includes a top surface, two first positioning holes and a bottom surface. The two first positioning holes of the lower membrane layer run through the top surface of the lower membrane layer and the bottom surface of the lower membrane layer. The bottom surface of the upper membrane layer faces the lower membrane layer. The top surface of the lower membrane layer faces the upper membrane layer. The spacer structure is arranged between the bottom surface of the upper membrane layer and the top surface of the lower membrane layer. The upper membrane layer and the lower membrane layer are separated from each other by the spacer structure. After the two hooks of the base plate are respectively penetrated upwardly through the corresponding first positioning holes of the lower membrane layer, the corresponding first positioning holes of the upper membrane layer and the corresponding first positioning holes of the contact point layer sequentially, the two hooks are inserted into the corresponding positioning recesses.

In an embodiment, the transparent key module further includes a top cover. The top cover is located over the connecting region of the lower part of the elastic member. The top cover includes a connecting frame and plural perforations. The plural perforations are respectively aligned with the plural keycaps. The plural keycap are exposed outside the corresponding perforations. The connecting frame includes a top surface and a bottom surface, and the plural perforations run through the top surface of the connecting frame and the bottom surface of the connecting frame, wherein the top cover further includes at least one protrusion post, and the at least one protrusion post is protruded downwardly from the bottom surface of the connecting frame.

In an embodiment, the connecting region of the elastic member includes at least one positioning hole, and the contact point layer includes a top surface, at least one second positioning holes, a bottom surface and at least one bump structure. The at least one bump structure of the contact point layer is formed on the top surface of the contact point layer. The at least one second positioning hole of the contact point layer runs through the top surface of the contact point layer and the bottom surface of the contact point layer. The switch circuit includes an upper membrane layer, a lower membrane layer and a spacer structure. The upper membrane layer includes a top surface, at least one second positioning hole and a bottom surface. The at least one second positioning hole runs through the top surface of the upper membrane layer and the bottom surface of the upper membrane layer. The bottom surface of the contact point layer faces the upper membrane layer. The lower membrane layer includes a top surface, at least one second positioning hole and a bottom surface. The at least one second positioning hole runs through the top surface of the lower membrane layer and the bottom surface of the lower membrane layer. The bottom surface of the upper membrane layer faces the lower membrane layer. The top surface of the lower membrane layer faces the upper membrane layer. The spacer structure is arranged between the bottom surface of the upper membrane layer and the top surface of the lower membrane layer. The upper membrane layer and the lower membrane layer are separated from each other by the spacer structure. The base plate includes a top surface, at least one positioning hole and a bottom surface. The top surface of the base plate faces the lower membrane layer. The at least one positioning hole of the base plate runs through the top surface of the base plate and the bottom surface of the base plate. After the at least one protrusion post of the top cover is downwardly penetrated through the corresponding positioning hole of connecting region of the elastic member, the corresponding second positioning hole of the contact point layer, the corresponding second positioning hole of the upper membrane layer and the corresponding second positioning hole of the lower membrane layer sequentially, the at least one protrusion post is inserted into the corresponding positioning hole of the base plate. Consequently, the elastic member, the contact point layer and the switch circuit are clamped between the top cover and the base plate.

In an embodiment, after the at least one protrusion post of the top cover is inserted into the corresponding positioning hole of the base plate, a sealing glue is formed around the protrusion post.

In an embodiment, after the at least one protrusion post of the top cover is inserted into the corresponding positioning hole of the base plate, a riveting head is formed at an end of the protrusion post through a riveting process.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

The present invention provides a transparent key module and a control device with the transparent key module.

Figure 1:
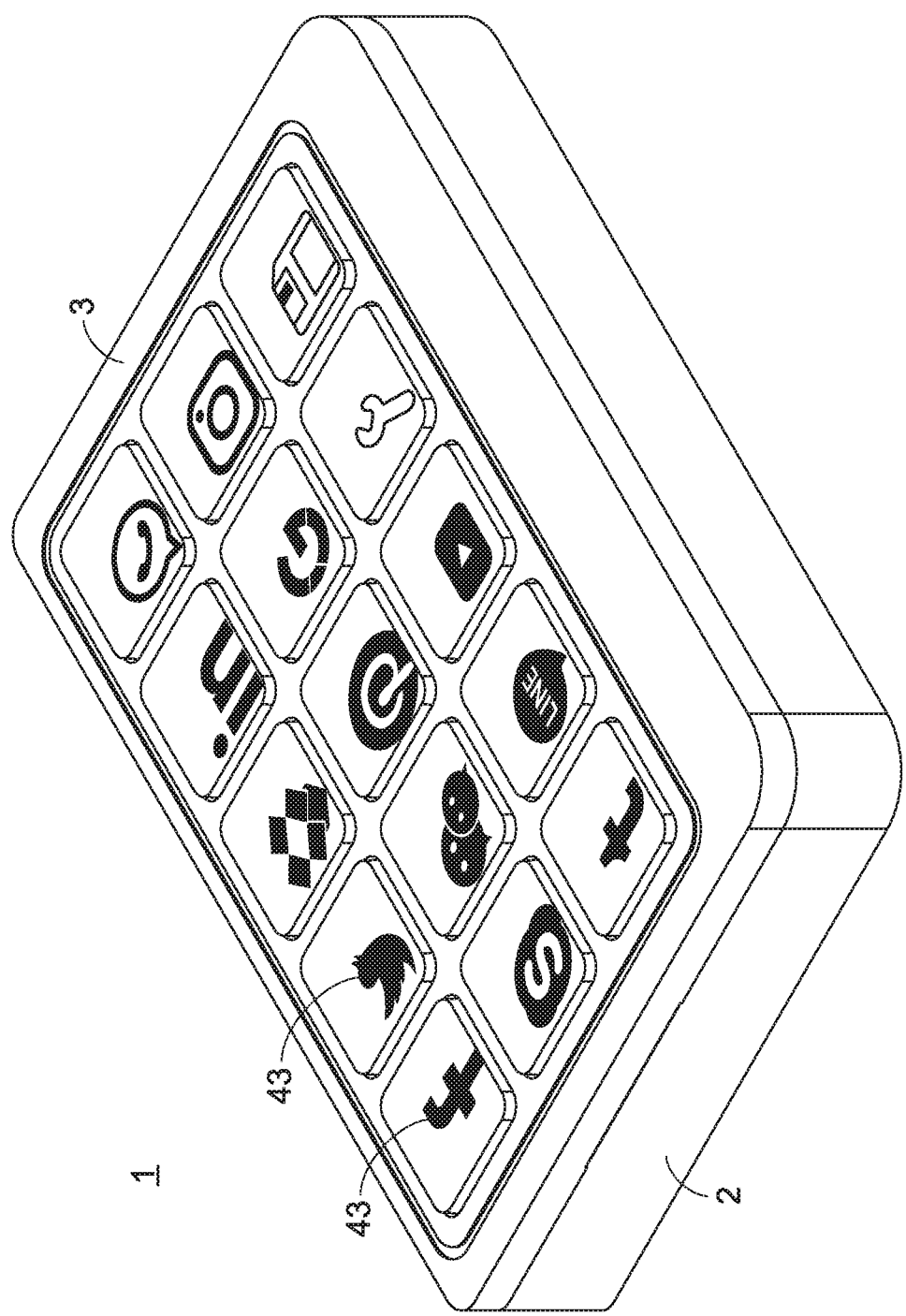
FIG. 1 is a schematic perspective view illustrating the assembled structure of a control device according to a first embodiment of the present invention.
Figure 2:
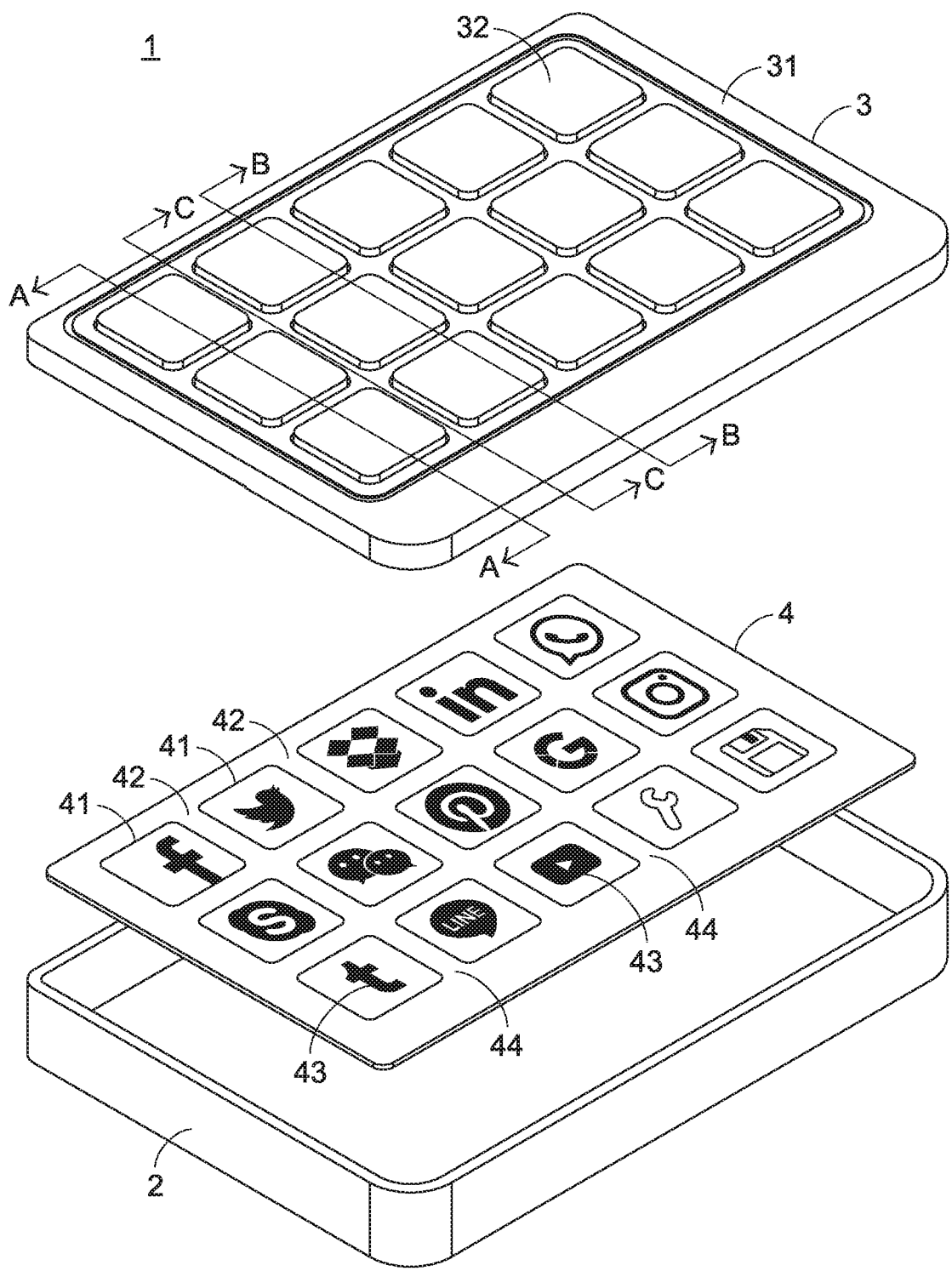
FIG. 2 is a schematic exploded view illustrating a portion of the control device as shown in FIG. 1.
Figure 3:
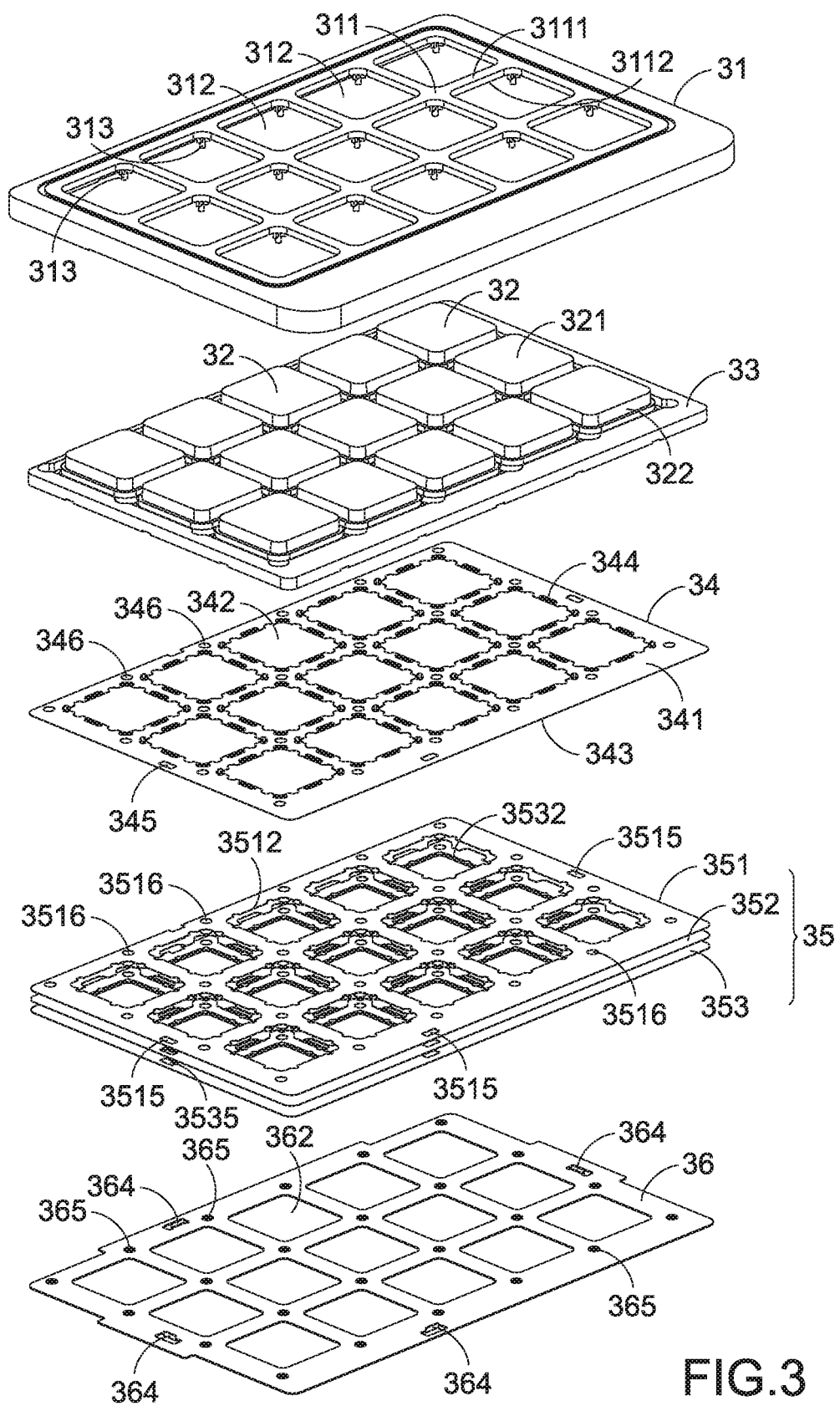
FIG. 3 is a schematic exploded view illustrating a see transparent key module of the control device as shown in FIG. 2.
Figure 4:
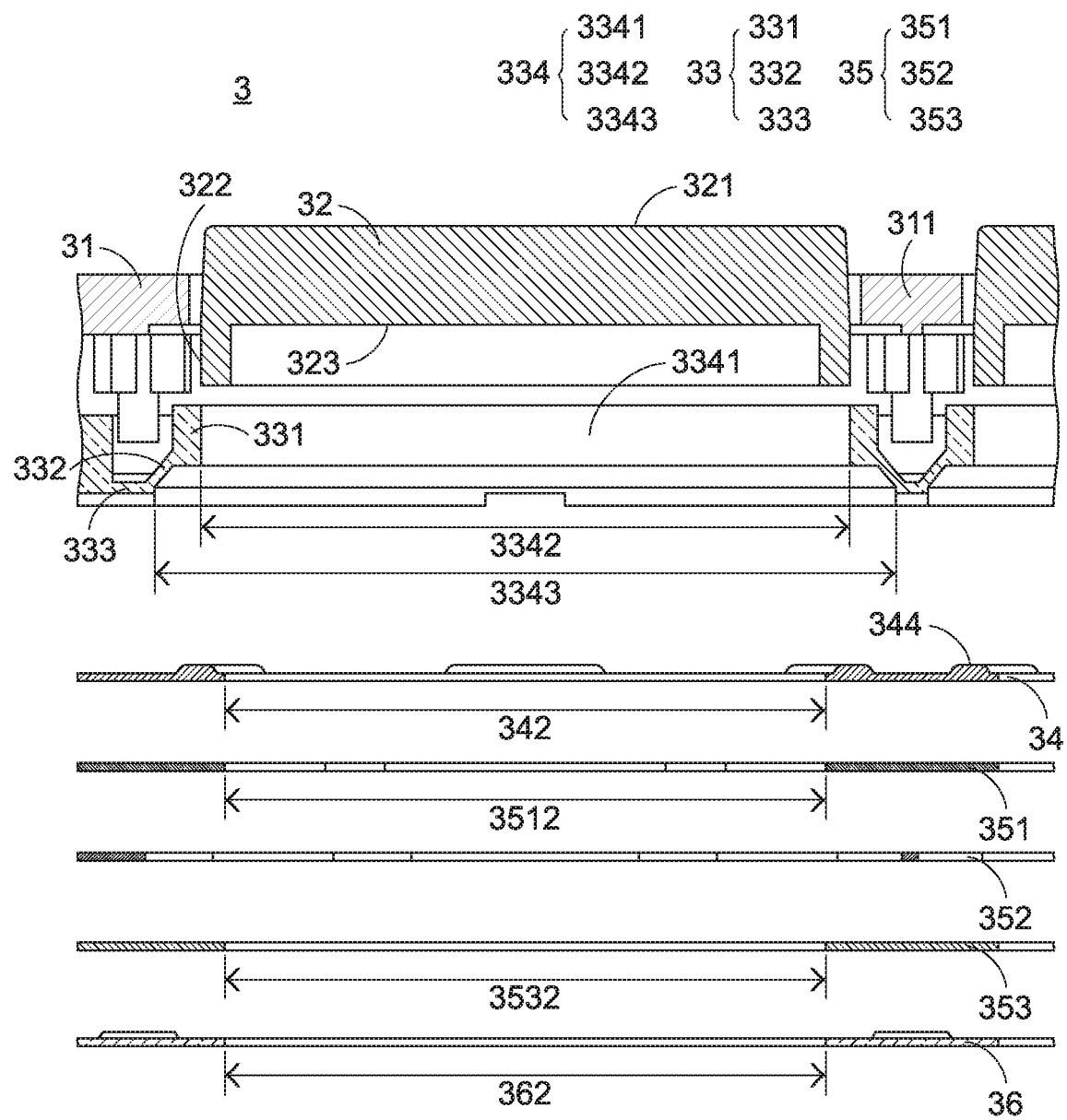
FIG. 4 is a schematic cross-sectional view illustrating a portion of the control device as shown in FIG. 2 and taken along the line A-A.
Figure 5:
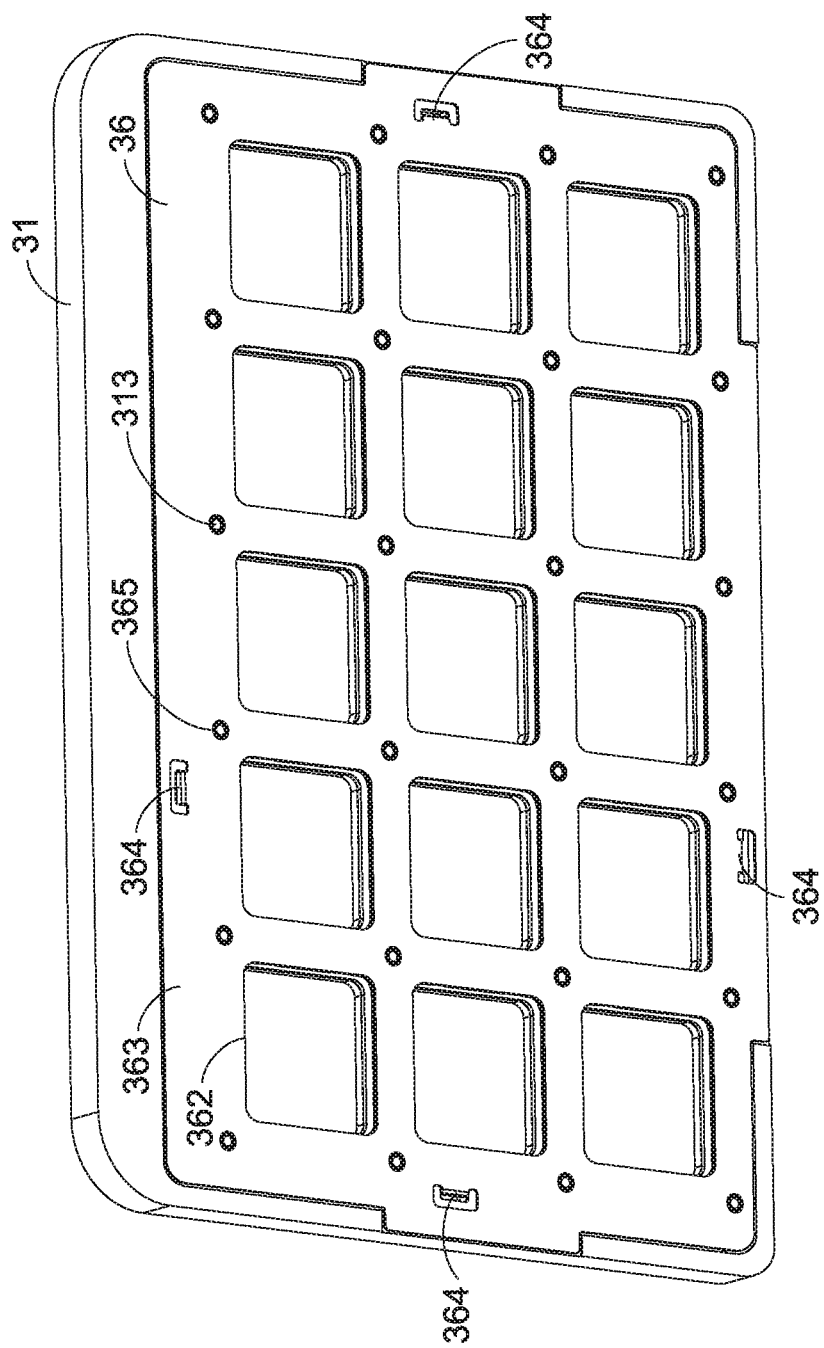
FIG. 5 is a schematic perspective view illustrating the transparent key module of the control device as shown in FIG. 2 and taken along another viewpoint.
Figure 6:
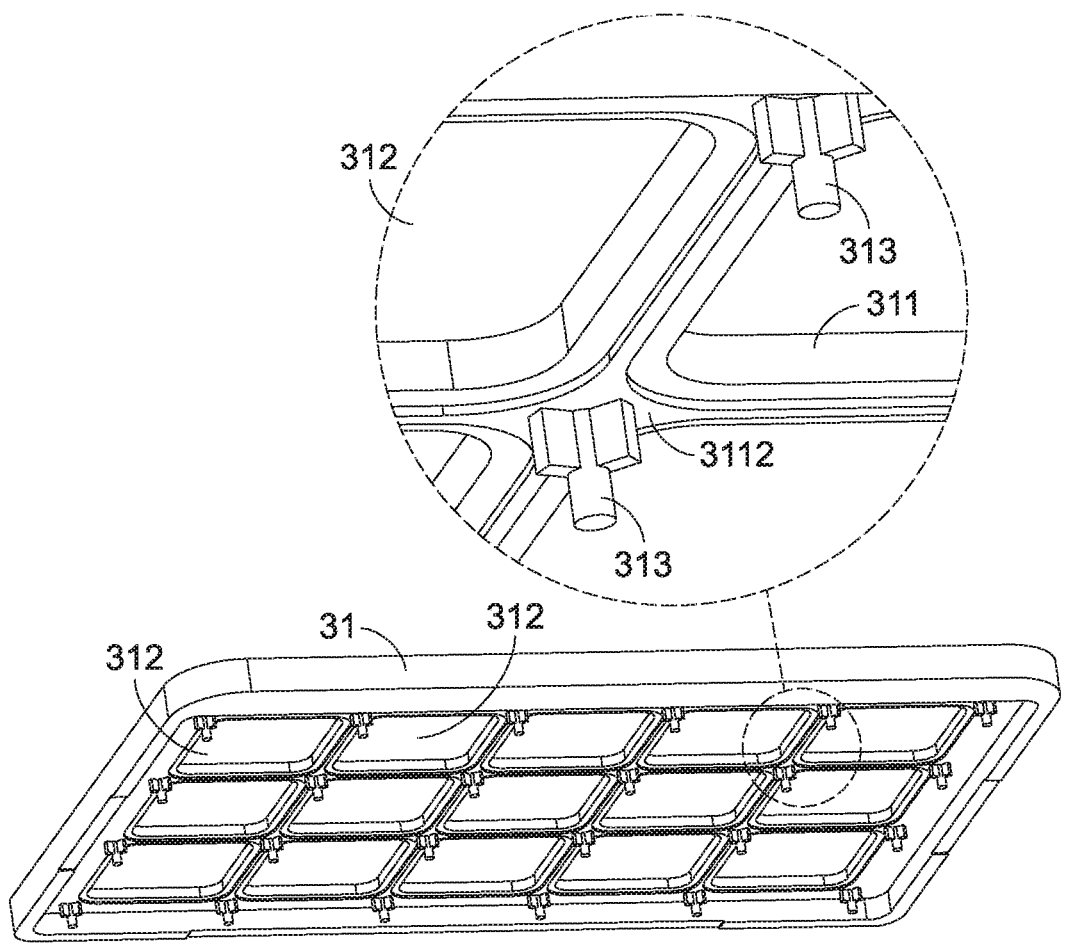
FIG. 6 is a schematic perspective view illustrating a top cover of the transparent key module as shown in FIG. 3 and taken along another viewpoint.
Figure 7:
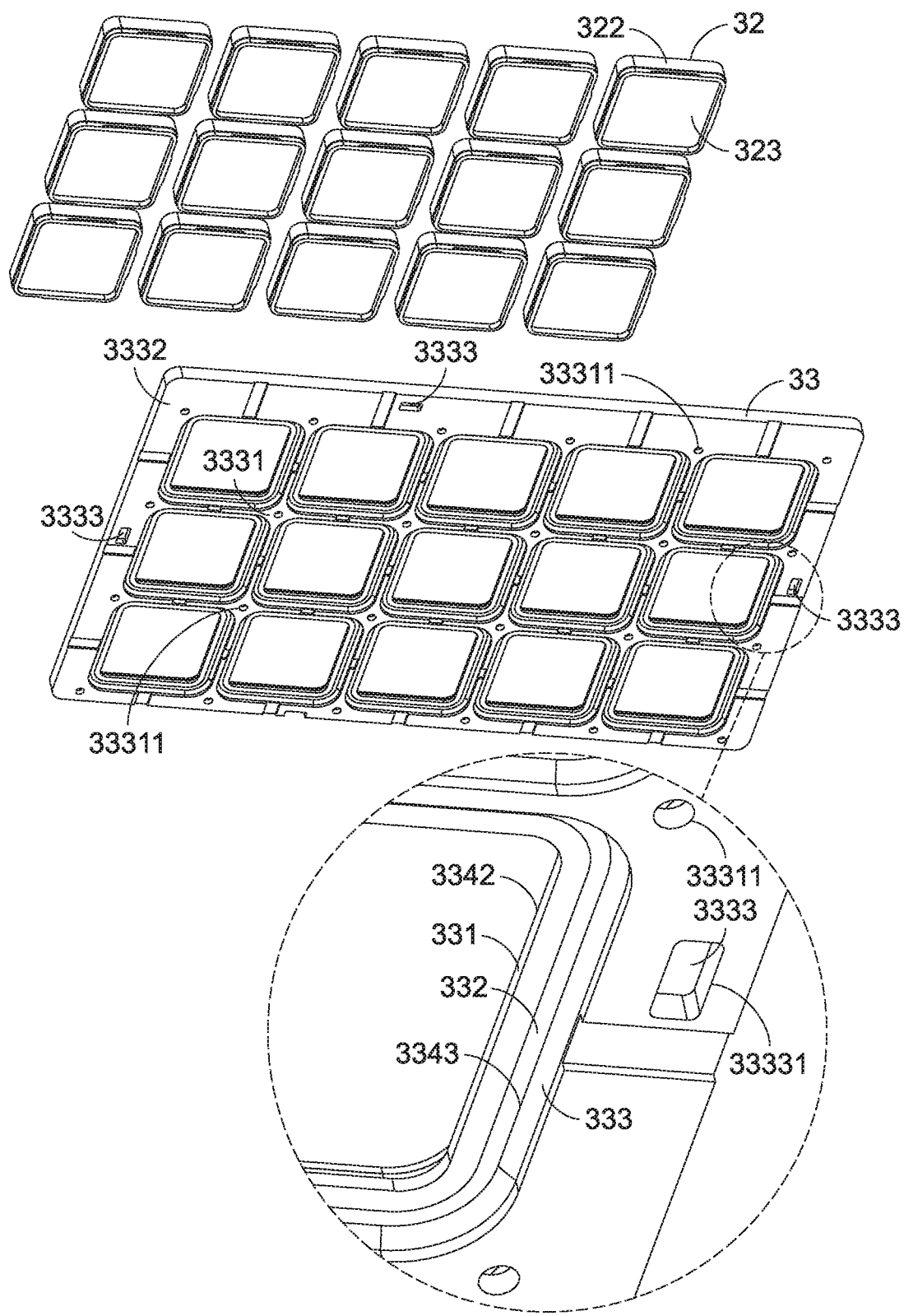
FIG. 7 is a schematic exploded view illustrating the relationship between keycaps and elastic members of the transparent key module as shown in FIG. 3.
Figure 8:
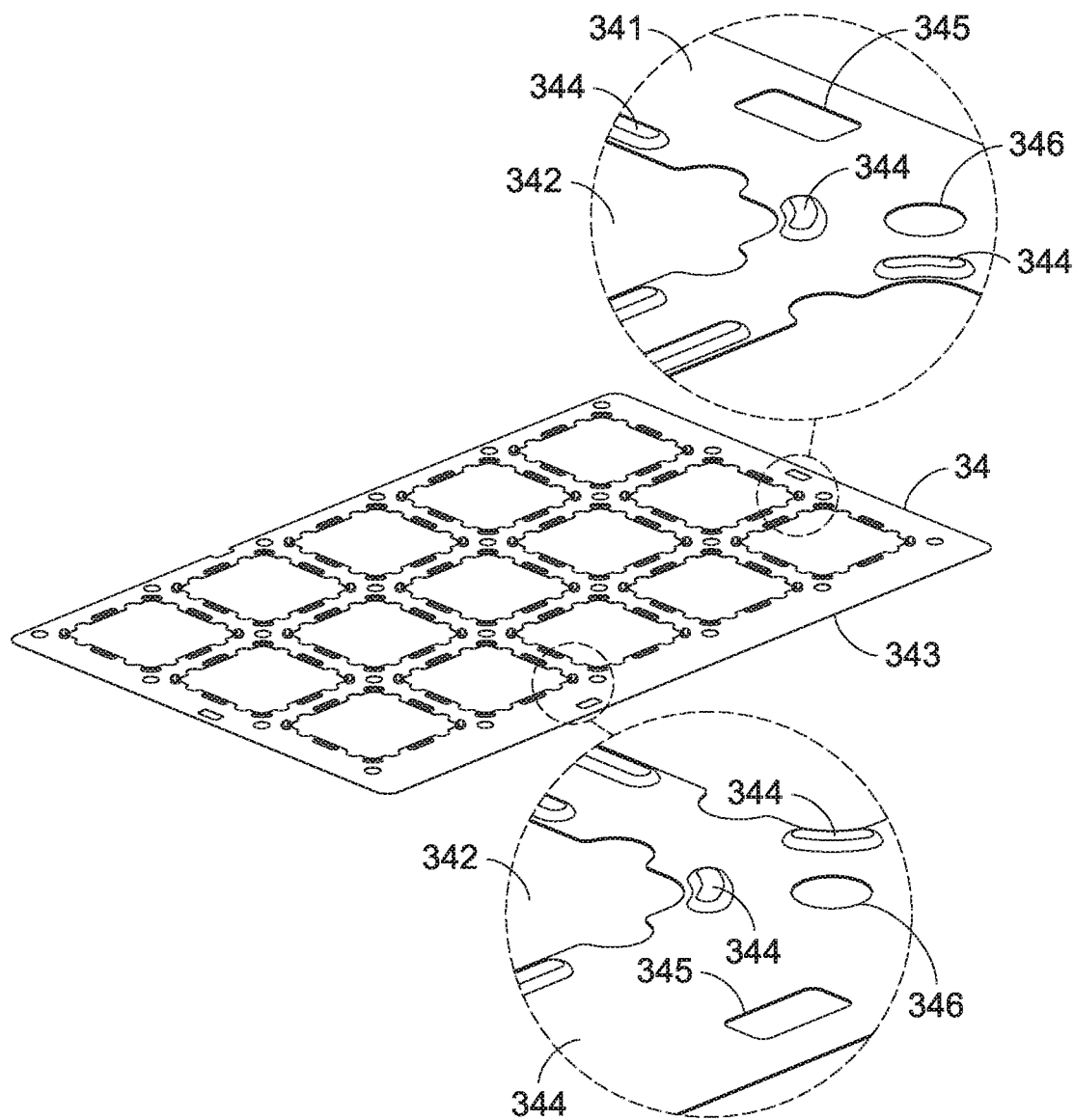
FIG. 8 is a schematic perspective view illustrating a contact point layer of the throughtransparent key module as shown in FIG. 3.
Figure 9:
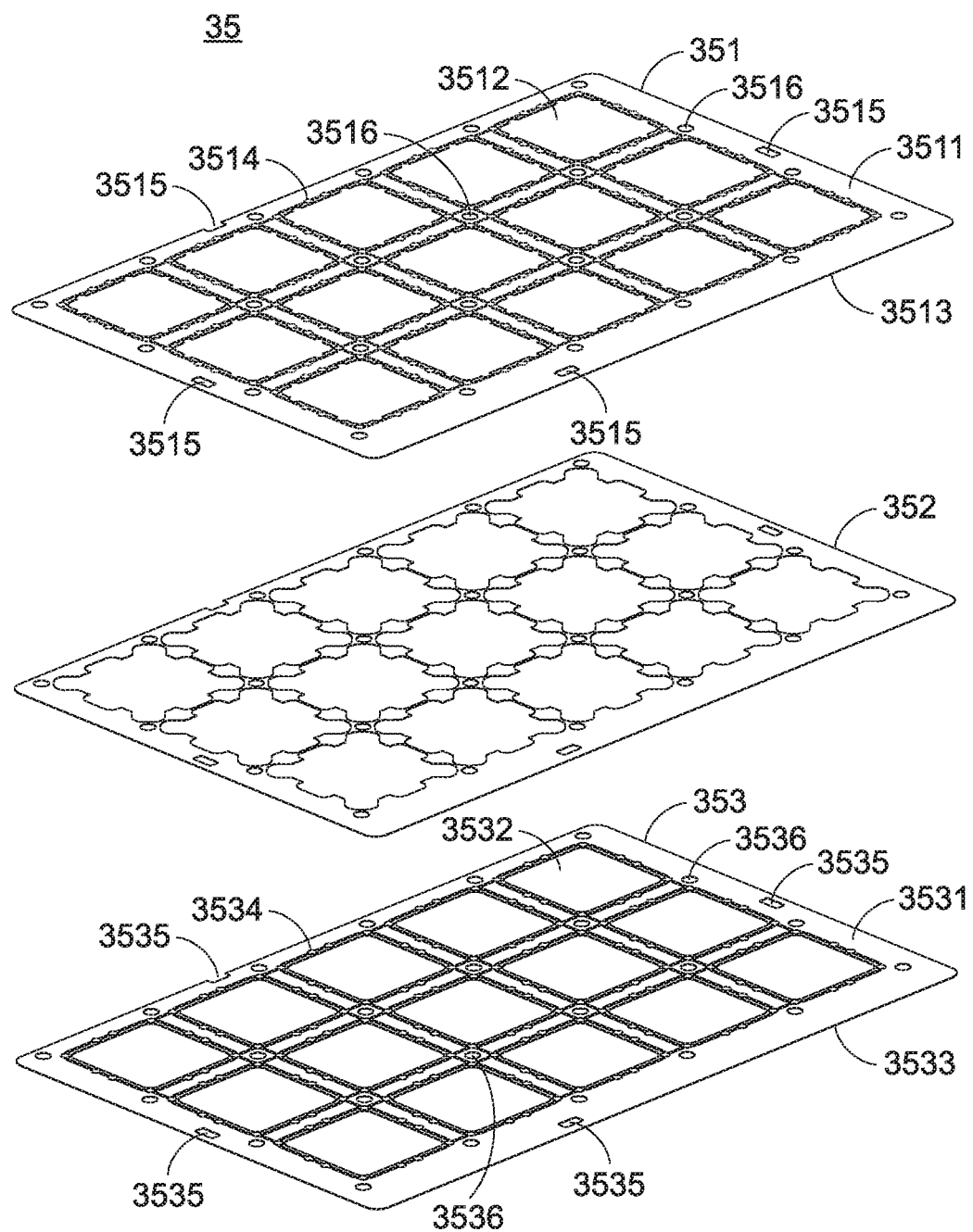
FIG. 9 is a schematic exploded view illustrating a switch circuit of the transparent key module as shown in FIG. 3.
Figure 10:
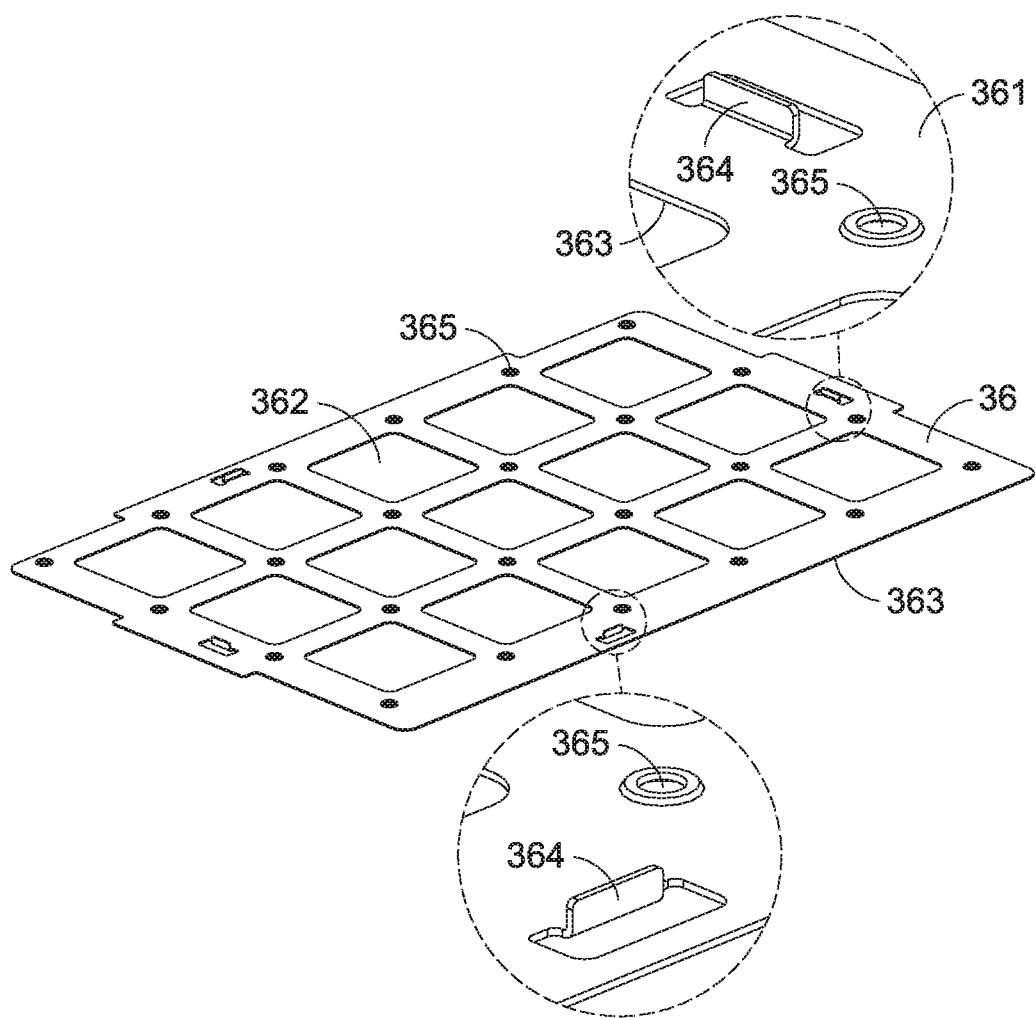
FIG. 10 is a schematic perspective view illustrating a base plate of the transparent key module as shown in FIG. 3.
Figure 11:
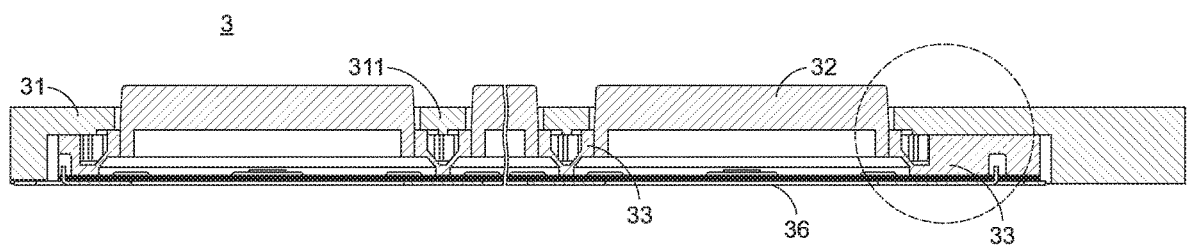
FIG. 11 is a schematic cross-sectional view illustrating the control device as shown in FIG. 2 and taken along the line B-B.
Figure 12:
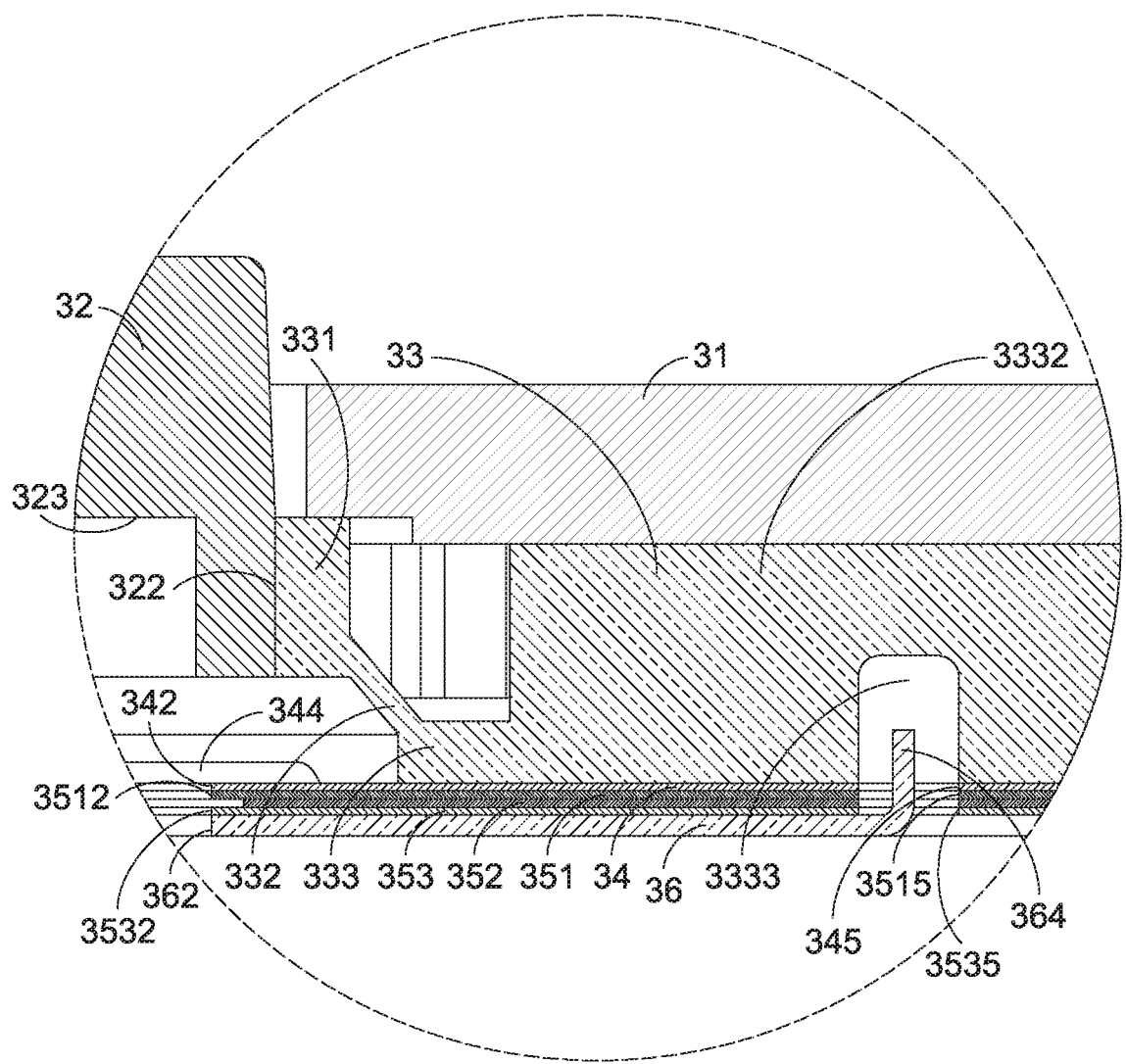
FIG. 12 is a schematic cross-sectional view illustrating an enlarged portion of the control device as shown in FIG. 11.
Figure 13:
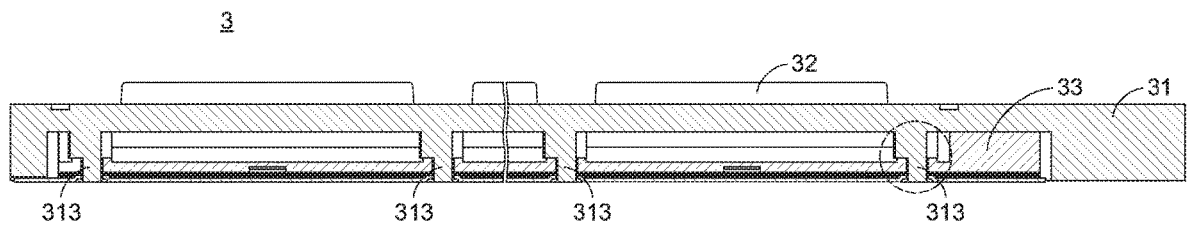
FIG. 13 is a schematic cross-sectional view illustrating the control device as shown in FIG. 2 and taken along the line C-C.
Figure 14:
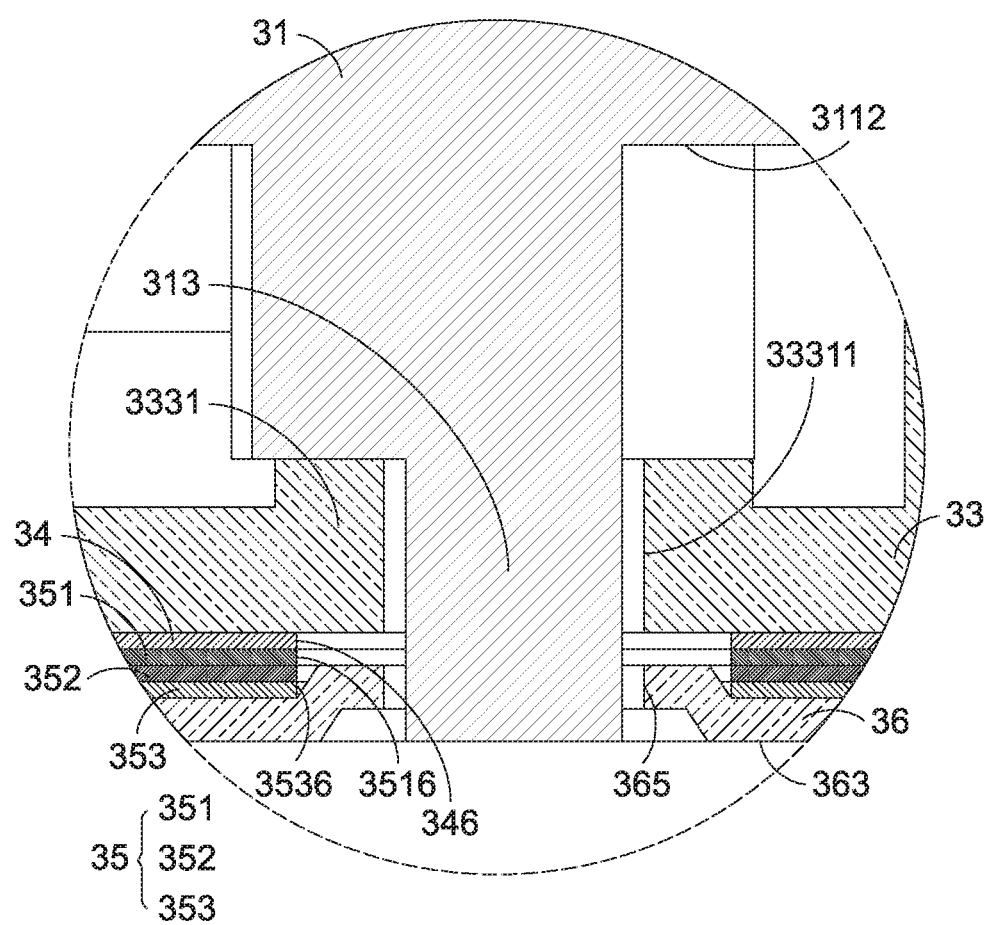
FIG. 14 is a schematic cross-sectional view illustrating an enlarged portion of the control device as shown in FIG. 13.

Please refer to FIGS. 1 to 14. FIG. 1 is a schematic perspective view illustrating the assembled structure of a control device according to a first embodiment of the present invention. FIG. 2 is a schematic exploded view illustrating a portion of the control device as shown in FIG. 1. FIG. 3 is a schematic exploded view illustrating a transparent key module of the control device as shown in FIG. 2. FIG. 4 is a schematic cross-sectional view illustrating a portion of the control device as shown in FIG. 2 and taken along the line A-A. FIG. 5 is a schematic perspective view illustrating the transparent key module of the control device as shown in FIG. 2 and taken along another viewpoint. FIG. 6 is a schematic perspective view illustrating a top cover of the transparent key module as shown in FIG. 3 and taken along another viewpoint. FIG. 7 is a schematic exploded view illustrating the relationship between keycaps and elastic members of the transparent key module as shown in FIG. 3. FIG. 8 is a schematic perspective view illustrating a contact point layer of the transparent key module as shown in FIG. 3. FIG. 9 is a schematic exploded view illustrating a switch circuit of the transparent key module as shown in FIG. 3. FIG. 10 is a schematic perspective view illustrating a base plate of the transparent key module as shown in FIG. 3. FIG. 11 is a schematic cross-sectional view illustrating the control device as shown in FIG. 2 and taken along the line B-B. FIG. 12 is a schematic cross-sectional view illustrating an enlarged portion of the control device as shown in FIG. 11. FIG. 13 is a schematic cross-sectional view illustrating the control device as shown in FIG. 2 and taken along the line C-C. FIG. 14 is a schematic cross-sectional view illustrating an enlarged portion of the control device as shown in FIG. 13.

In the first embodiment, the control device 1 is provided. The control device 1 can be applied to a live streaming controller, an ordering machine, an audio-video streaming controller, an image editing controller, a peripheral device controller or a shortcut key controller.

In this embodiment, the control device 1 comprises an outer casing 2, a transparent key module 3 and a display panel 4.

The transparent key module 3 and the display panel 4 are accommodated within the outer casing 2. Optionally, a processor, a signal processing device and a communication interface are disposed within the control device 1. The processor, the signal processing device and the communication interface are in communication with the transparent key module 3 and the display panel 4.

In an embodiment, transparent key module 3 comprises a top cover 31, plural keycaps 32, an elastic member 33, a contact point layer 34, a switch circuit 35 and a base plate 36.

The top cover 31 comprises a connecting frame 311 and plural perforations 312. The plural perforations 312 are respectively aligned with the plural keycaps 32. Consequently, the keycap 32 can be exposed outside through the corresponding perforations 312. The connecting frame 311 comprises a top surface 3111 and a bottom surface 3112. The plural perforations 312 run through the top surface 3111 and the bottom surface 3112 of the connecting frame 311. The top cover 31 further comprises at least one protrusion post 313. The at least one protrusion post 313 is protruded downwardly from the bottom surface 3112 of the connecting frame 311.

In an embodiment, the keycap 32 comprises a press part 321, a lateral wall 322 and a bottom surface 323. The lateral wall 322 is arranged between the press part 321 and the bottom surface 323. The keycap 32 is a light-transmissible keycap. For example, the keycap 32 is fully transparent or translucent. Consequently, the light beam generated by the display panel 4 (e.g., the graphic image shown on the display panel 4) can be transmitted upwardly through the keycap 32 so as to be viewed by the user.

The elastic member 33 provides an elastic force for moving upwardly and downwardly the keycap 32 in a reciprocating manner.

In an embodiment, the elastic member 33 comprises plural support parts 331, plural lateral parts 332 and a lower part 333. Each support part 331 of the elastic member 33 is connected with the corresponding keycap 32. For example, each support part 331 of the elastic member 33 is connected with and fixed on the lateral wall 322 of the corresponding keycap 32 or other part of the corresponding keycap 32.

Each lateral part 332 is arranged between the corresponding support part 331 and the lower part 333. The lower part 333 comprises a connecting region 3331 and a periphery region 3332. The plural lateral parts 332 are installed on the connecting region 3331 of the lower part 333. The periphery region 3332 is arranged around the connecting region 3331. The connecting region 3331 of the lower part 333 comprises at least one positioning hole 33311. The periphery region 3332 of the lower part 333 comprises at least one positioning recess 3333. An entrance 33331 of the lower part 333 faces the base plate 36 downwardly.

From top to bottom, the support part 331, the corresponding lateral part 332 and the lower part 333 of the elastic member 33 are collaboratively formed as a crater-shaped structure 334. A central portion the crater-shaped structure 334 has a hollow chamber 3341. The hollow chamber 3341 comprises a first opening 3342 and a second opening 3343. The first opening 3342 and the second opening 3343 are respectively located at two opposite ends of the hollow chamber 3341. The first opening 3342 is located near the keycap 32. In addition, the first opening 3342 is defined by the support part 331 of the elastic member 33. The second opening 3343 is located near the underlying contact point layer 34 and the underlying switch circuit 35. In addition, the second opening 3343 is defined by the lower part 333 of the elastic member 33.

The contact point layer 34 is located under the elastic member 33. In an embodiment, the contact point layer 34 comprises a top surface 341, plural light-transmissible openings 342, a bottom surface 343, at least one bump structure 344, at least one first positioning hole 345 and at least one second positioning hole 346. The at least one bump structure 344 is formed on the top surface 341 of the contact point layer 34 and used as the contact point to be pressed. In addition, the at least one bump structure 344 is located near the corresponding light-transmissible opening 342. The plural light-transmissible openings 342, the at least one first positioning hole 345 and the at least one second positioning hole 346 run through the top surface 341 and the bottom surface 343 of the contact point layer 34. The bottom surface 343 of the contact point layer 34 faces an upper membrane layer 351 of the switch circuit 35.

The switch circuit 35 is located under the elastic member 33 and the contact point layer 34. In an embodiment, the switch circuit 35 comprises an upper membrane layer 351, a spacer structure 352 and a lower membrane layer 353.

The upper membrane layer 351 comprises a top surface 3511, plural light-transmissible openings 3512, a bottom surface 3513, at least one first positioning hole 3515 and at least one second positioning hole 3516. The plural light-transmissible openings 3512, the at least one first positioning hole 3515 and the at least one second positioning hole 3516 run through the top surface 3511 and the bottom surface 3513 of the upper membrane layer 351. The bottom surface 3513 of the upper membrane layer 351 faces the lower membrane layer 353. The upper membrane layer 351 further comprises plural circuit contact points 3514. The plural circuit contact points 3514 are formed on the bottom surface 3513 of the upper membrane layer 351. In addition, the plural circuit contact points 3514 are located near the corresponding light-transmissible openings 3512.

The lower membrane layer 353 comprises a top surface 3531, plural light-transmissible openings 3532, a bottom surface 3533, at least one first positioning hole 3535 and at least one second positioning hole 3536. The plural light-transmissible openings 3532, the at least one first positioning hole 3535 and the at least one second positioning hole 3536 run through the top surface 3531 and the bottom surface 3533 of the lower membrane layer 353. The top surface 3531 of the lower membrane layer 353 faces the upper membrane layer 351. The lower membrane layer 353 further comprises plural circuit contact points 3534. The plural circuit contact points 3534 are formed on the top surface 3531 of the lower membrane layer 353. In addition, the plural circuit contact points 3534 are located near the corresponding light-transmissible openings 3532.

The spacer structure 352 is arranged between the bottom surface 3513 of the upper membrane layer 351 and the top surface 3531 of the lower membrane layer 353. In addition, the upper membrane layer 351 and the lower membrane layer 353 are separated from each other by the spacer structure 352.

In an embodiment, the spacer structure 352 is an ink structure. For example, the ink structure is a printing ink structure, a thermal baking ink structure, a quick drying ink structure or a moisture curing ink structure. It is noted that the example of the spacer structure is not restricted. For example, in another embodiment, the spacer structure is a space layer. The plural circuit contact points 3514 of the upper membrane layer 351 and the corresponding circuit contact points 3534 of the lower membrane layer 353 are overlapped with each other along the vertical direction. In addition, the plural circuit contact points 3514 of the upper membrane layer 351 and the corresponding circuit contact points 3534 of the lower membrane layer 353 are separated from each other by the spacer structure 352.

The size of the light-transmissible opening 3512 of the upper membrane layer 351 is smaller than the size of the second opening 3343 of the crater-shaped structure 334. The size of the light-transmissible opening 3532 of the lower membrane layer 353 is also smaller than the size of the second opening 3343 of the crater-shaped structure 334. Consequently, while the keycap 32 is pressed down by the user, the corresponding support part 331 of the elastic member 33 or the keycap 32 is penetrated downwardly through the second opening 3343 of the crater-shaped structure 334 to press the contact point layer 34 and the upper membrane layer 351 of the switch circuit 35. When the circuit contact point 3514 of the upper membrane layer 351 is contacted with the corresponding circuit contact point 3534 of the lower membrane layer 353, the pressing action of the user is converted into a pressing signal by the switch circuit 35. The pressing signal is transmitted to a control circuit of the control device 1 or a main board.

The base plate 36 is located under the switch circuit 35. In an embodiment, the base plate 36 comprises a top surface 361, plural light-transmissible openings 362, a bottom surface 363, at least one hook 364 and at least one positioning hole 365. The top surface 361 of the base plate 36 faces the lower membrane layer 353. The base plate 36 is made of a metallic material or a plastic material. For example, the base plate 36 is a cold-rolled steel plate (SPCC), a galvanized steel plate (SECC), an aluminum plate or any other appropriate metal plate. Alternatively, the base plate 36 is a plastic plate made of polycarbonate (PC), polyester film (Mylar) or acrylic butadiene styrene (ABS).

The size of the light-transmissible opening 362 of the base plate 36 is smaller than or equal to the size of the light-transmissible opening 3532 of the lower membrane layer 353. In addition, the light-transmissible opening 362 of the base plate 36 is aligned with the light-transmissible opening 3532 of the lower membrane layer 353 along the vertical direction. Consequently, when the pressing action is performed by the user and the circuit contact point 3534 of the lower membrane layer 353 is triggered by the circuit contact point 3514 of the upper membrane layer 351, the lower membrane layer 353 can be supported by the top surface 361 of the base plate 36. Consequently, the pressing action can be effectively performed. Due to the protection of the base plate 36, the underlying display panel 4 will not be touched or affected in response to the pressing action of the user. Consequently, the problem of causing interference patterns on the display panel 4 will be avoided.

As mentioned above, the base plate 36 can provide the function of supporting the switch circuit 35. Furthermore, the base plate 36 provides the alignment function. For example, after the at least one hook 364 of the base plate 36 is penetrated upwardly through the switch circuit 35 and the contact point layer 34, the at least one hook 364 of the base plate 36 is introduced into the corresponding positioning recess 3333 of the elastic member 33 through the entrance 33331 of the elastic member 33. Consequently, the contact point layer 34 and the switch circuit 35 are fixed between the elastic member 33 and the base plate 36. At the same time, the alignment between the elastic member 33, the contact point layer 34, the switch circuit 35 and the base plate 36 (i.e., four components) can be achieved. Since the base plate 36 and the elastic member 33 are specially designed, the process of aligning various components can be simplified. In addition, the process of assembling the whole transparent key module 3 can be accelerated.

For example, after the at least one hook 364 of the base plate 36 is penetrated upwardly through the corresponding first positioning hole 3535 of the lower membrane layer 353, the corresponding first positioning hole 3515 of the upper membrane layer 351 and the corresponding first positioning hole 345 of the contact point layer 34, the at least one hook 364 of the base plate 36 is introduced into the corresponding positioning recess 3333 of the elastic member 33 through the entrance 33331 of the elastic member 33.

In an embodiment, the at least one hook 364 of the base plate 36 includes plural hooks 364. For example, in case that the base plate 36 comprises two hooks 364, the two hooks 364 are respectively located at two opposite sides of the base plate 36. For example, the two hooks 364 are respectively located at a front side and a rear side of the base plate 36, or the two hooks 364 are respectively located at a left side and a right side of the base plate 36. Correspondingly, the at least one positioning recess 3333 of the elastic member 33 includes two positioning recesses 3333. In addition, the two positioning recesses 3333 are respectively located at two opposite sides of the periphery region 3332 of the elastic member 33. Similarly, the at least one first positioning hole 345 of the contact point layer 34 includes two first positioning holes 345, and the two first positioning holes 345 are respectively located at two opposite sides of the contact point layer 34. Similarly, the at least one first positioning hole 3515 of the upper membrane layer 351 includes two first positioning holes 3515, and the two first positioning holes 3515 are respectively located at two opposite sides of the upper membrane layer 351. Similarly, the at least one first positioning hole 3535 of the lower membrane layer 353 includes two first positioning holes 3535, and the two first positioning holes 3535 are respectively located at two opposite sides of the lower membrane layer 353. After the two hooks 364 of the base plate 36 are penetrated upwardly through the two corresponding first positioning holes 3535 of the lower membrane layer 353, the two corresponding first positioning holes 3515 of the upper membrane layer 351 and the two corresponding first positioning holes 345 of the contact point layer 34, the two hooks 364 of the base plate 36 are introduced into the two corresponding positioning recesses 3333 of the elastic member 33 through the two corresponding entrances 33331 of the elastic member 33.

In another embodiment, the base plate 36 comprises four hooks 364, and the four hooks 364 are respectively located at a front side, a rear side, a left side and a right side of the base plate 36. Consequently, the numbers and the positions of the first positioning holes 345 of the contact point layer 34, the first positioning holes 3515 of the upper membrane layer 351 and the first positioning holes 3535 of the lower membrane layer 353 are correspondingly adjusted.

Furthermore, the elastic member 33, the contact point layer 34 and the switch circuit 35 of the transparent key module 3 are clamped between the top cover 31 and the base plate 36. Consequently, the whole transparent key module 3 can be assembled.

The top cover 31 is located over the connecting region 3331 of the lower part 333 of the elastic member 33. During the process of assembling the transparent key module 3, the at least one protrusion post 313 of the top cover 31 is downwardly and sequentially penetrated through the corresponding positioning hole 33311 of the elastic member 33, the corresponding second positioning hole 346 of the contact point layer 34, the corresponding second positioning hole 3516 of the upper membrane layer 351 and the corresponding second positioning hole 3536 of the lower membrane layer 353 and inserted into the corresponding positioning hole 365 of the base plate 36. In this way, the elastic member 33, the contact point layer 34 and the switch circuit 35 are clamped between the top cover 31 and the base plate 36. Consequently, the modularized design of the transparent key module 3 is achieved.

The present invention further provides various fixing mechanisms. When the at least one protrusion post 313 of the top cover 31 is inserted into the corresponding positioning hole 365 of the base plate 36, the top cover 31 and the base plate 36 are fixed on each other through one of the fixing mechanisms.

Figure 15:
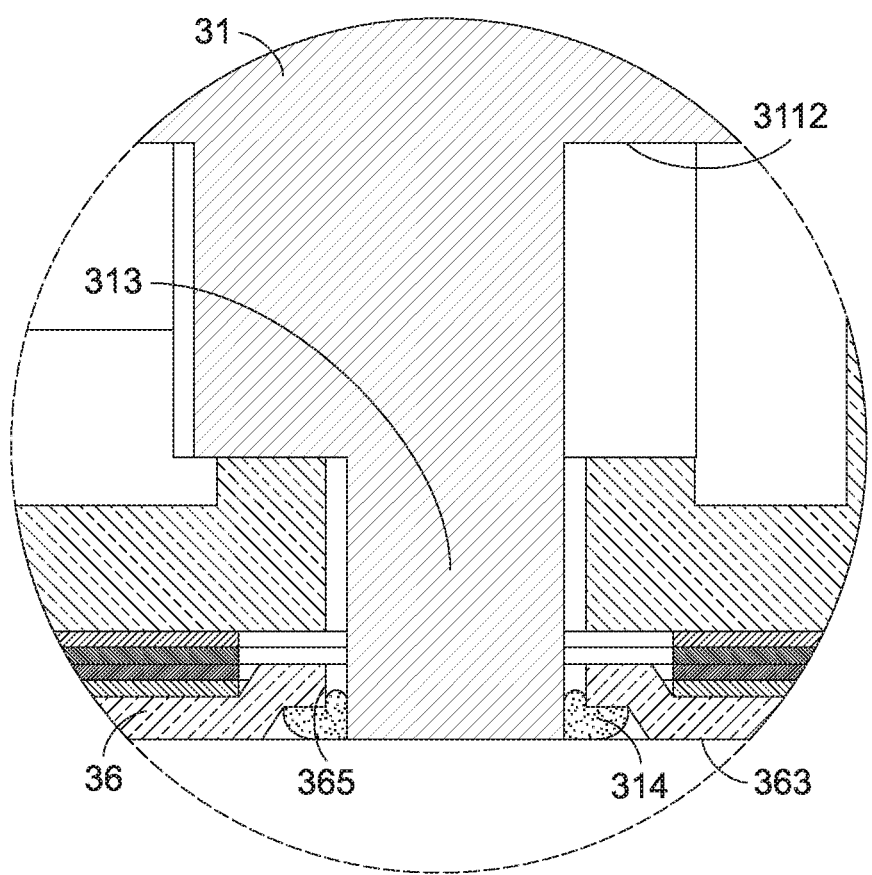
FIG. 15 is a schematic cross-sectional view illustrating the use of a sealing glue to fix the protrusion post of the top cover in the positioning hole of the base plate.

FIG. 15 is a schematic cross-sectional view illustrating the use of a sealing glue to fix the protrusion post of the top cover in the positioning hole of the base plate. In this embodiment, after the protrusion post 313 of the top cover 31 is inserted into the positioning hole 365 of the base plate 36, a sealing glue 314 is formed around the protrusion post 313 of the top cover 31. By the sealing glue 314, the protrusion post 313 is fixed in the positioning hole 365.

Figure 16:
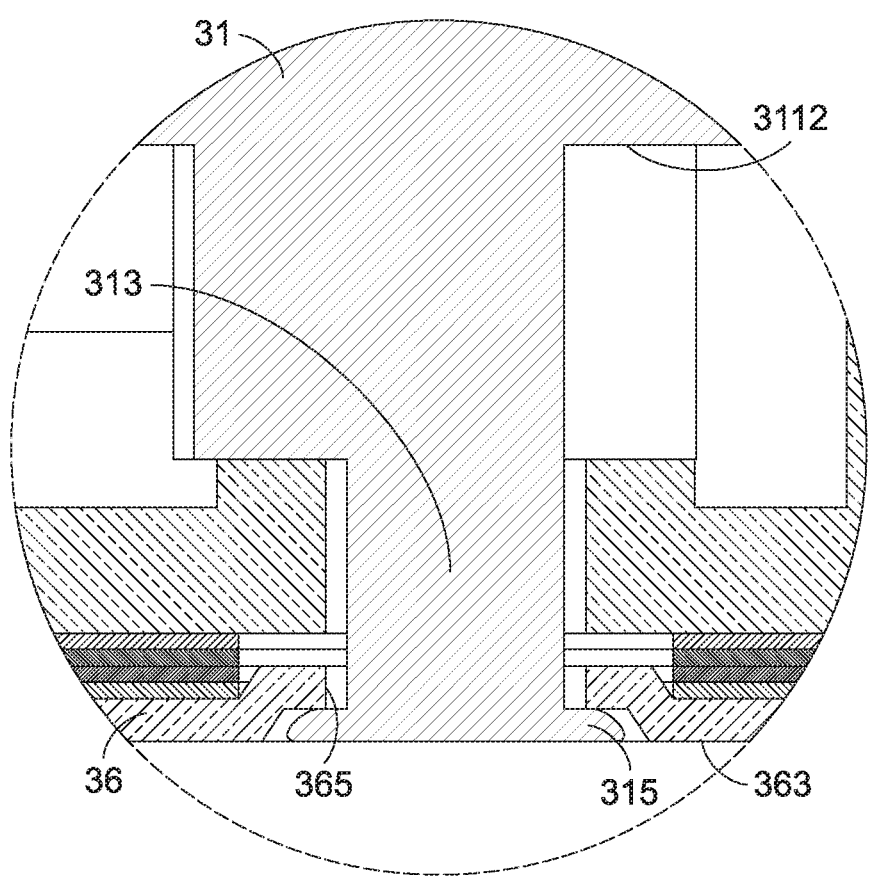
FIG. 16 is a schematic cross-sectional view illustrating the use of a riveting process to form a riveting head to fix the protrusion post of the top cover in the positioning hole of the base plate.

FIG. 16 is a schematic cross-sectional view illustrating the use of a riveting process to form a riveting head to fix the protrusion post of the top cover in the positioning hole of the base plate. In this embodiment, after the protrusion post 313 of the top cover 31 is inserted into the positioning hole 365 of the base plate 36, a riveting head 315 is formed at an end of the protrusion post 313 through a riveting process. The riveting process is a hot press riveting, a hot air riveting process or an ultrasonic riveting process.

Furthermore, a concave structure is formed in the bottom side of the base plate 36 and at the outer periphery of the positioning hole 365. That is, the region of the base plate 36 near the positioning hole 365 is bent or inclined toward the switch circuit 35. The sealing glue 314 or the riveting head 315 may be accommodated within the concave structure at the outer periphery of the positioning hole 365. Consequently, the bottom surface 363 of the base plate 36 can be kept flat.

A display region of the display panel 4 is divided into plural sub-display regions 41 and at least one background region 42. The background region 42 is the area of the display panel 4 excluding the sub-display regions 41. Every two adjacent sub-display regions 41 are separated from each other by the corresponding background region 42. Consequently, there is a clearer boundary between every two adjacent sub-display regions 41. A graphic image 43 is outputted from or shown on the at least one sub-display region 41 of the display panel 4. The graphic image 43 contains a specified image, information or picture. The content of the graphic image 43 can be set, controlled and changed by the user. A non-graphic image 44 is shown on the at least one background region 42 of the display panel 4. For example, the non-graphic image 44 is a background color image or an opaque region without any image.

In the control device 1, the transparent key module 3 is located over the display panel 4. Moreover, the non-graphic image 44 is shaded by the trnasparent key module 4 along the vertical direction, but the graphic image 43 is exposed through the transparent key module 3.

The graphic images 43 outputted from the display panel 4 is transmitted upwardly through the at least one light-transmissible opening 362 of the base plate 36, the at least one light-transmissible opening 3532 of the lower membrane layer 353, the at least one light-transmissible opening 3512 of the upper membrane layer 351, the light-transmissible openings 342 of the contact point layer 34, the second opening 3343 of the at least one crater-shaped structure 334, the first opening 3342 of the at least one crater-shaped structure 334 and the keycap 32. Consequently, the graphic images 43 can be viewed by the user directly. During the transmission, the graphic images 43 outputted from the display panel 4 will not be shaded or hindered. In other words, the graphic images 43 outputted from the display panel 4 is directly transmitted through the at least one light-transmissible opening 362 of the base plate 36, the at least one light-transmissible opening 3532 of the lower membrane layer 353, the at least one light-transmissible opening 3512 of the upper membrane layer 351, the light-transmissible openings 342 of the contact point layer 34, the second opening 3343 of the at least one crater-shaped structure 334 and the first opening 3342 of the at least one crater-shaped structure 334. After the graphic images 43 is transmitted through the keycap 32, the graphic images 43 can be completely and upwardly transmitted and not shaded by the keycap 32. Conventionally, in the backlight keyboard, only the character region of the keycap is illuminated, but the non-character region of the keycap is shaded by a light-shading layer. In other words, the illumination design of the keycap in the control device of the present invention is distinguished.

In an embodiment, the display panel 4 to cooperatively work with the transparent key module 3 is a liquid crystal display (LCD) panel or an organic light emitting diode (OLED) panel. Alternatively, the display panel is an electronic paper panel such as an electrophoretic display (EPD) panel or a cholesteric liquid crystal display (ChLCD) panel.

In some other embodiments, the transparent key module is not equipped with the contact point layer 34. Under this circumstance, the elastic member 33 is in direct contact with the underlying switch circuit 35.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A transparent key module, comprising:
    plural keycaps;
    an elastic member comprising plural support parts, plural lateral parts and a lower part, wherein each of the plural support parts is connected with a keycap of the plural keycaps, each of the plural lateral parts is arranged between a support part of the plural support parts and the lower part, the lower part comprises a connecting region and a periphery region, the plural lateral parts are installed on the connecting region of the lower part, the periphery region is arranged around the connecting region, and the periphery region of the lower part comprises at least one positioning recess;
    a switch circuit located under the elastic member; and
    a base plate located under the switch circuit, and comprising at least one hook, wherein the at least one hook is penetrated upwardly through the switch circuit and inserted into the at least one positioning recess, so that the switch circuit is fixed between the elastic member and the base plate.

2. The transparent key module according to claim 1, wherein the switch circuit comprises:
    an upper membrane layer comprising a top surface, at least one first positioning hole and a bottom surface, wherein the at least one first positioning hole of the upper membrane layer runs through the top surface of the upper membrane layer and the bottom surface of the upper membrane layer;
    a lower membrane layer comprising a top surface, at least one first positioning hole and a bottom surface, wherein the at least one first positioning hole of the lower membrane layer runs through the top surface of the lower membrane layer and the bottom surface of the lower membrane layer, the bottom surface of the upper membrane layer faces the lower membrane layer, and the top surface of the lower membrane layer faces the upper membrane layer; and
    a spacer structure arranged between the bottom surface of the upper membrane layer and the top surface of the lower membrane layer, wherein the upper membrane layer and the lower membrane layer are separated from each other by the spacer structure,
    wherein after the at least one hook of the base plate is penetrated upwardly through the at least one first positioning hole of the lower membrane layer and the at least one first positioning hole of the upper membrane layer sequentially, the at least one hook is inserted into the positioning recess.

3. The transparent key module according to claim 1, wherein the at least one positioning recess includes two positioning recesses, and the two positioning recesses are respectively located at two opposite sides of the periphery region of the elastic member, wherein the at least one hook includes two hooks, and the two hooks are respectively located at two opposite sides of the base plate, wherein the switch circuit comprises:
    an upper membrane layer comprising a top surface, two first positioning holes and a bottom surface, wherein the two first positioning holes of the upper membrane layer run through the top surface of the upper membrane layer and the bottom surface of the upper membrane layer;
    a lower membrane layer comprising a top surface, two first positioning holes and a bottom surface, wherein the two first positioning holes of the lower membrane layer run through the top surface of the lower membrane layer and the bottom surface of the lower membrane layer, the bottom surface of the upper membrane layer faces the lower membrane layer, and the top surface of the lower membrane layer faces the upper membrane layer; and
    a spacer structure arranged between the bottom surface of the upper membrane layer and the top surface of the lower membrane layer, wherein the upper membrane layer and the lower membrane layer are separated from each other by the spacer structure, wherein after the two hooks of the base plate are respectively penetrated upwardly through the two first positioning holes of the lower membrane layer and the two first positioning holes of the upper membrane layer sequentially, the two hooks are inserted into the positioning recesses.

4. The transparent key module according to claim 1, wherein from a top to bottom, each of the plural support parts, the lateral part and the lower part in the elastic member are collaboratively formed as a crater-shaped structure, wherein a central portion of the crater-shaped structure has a hollow chamber.

5. The transparent key module according to claim 4, wherein the hollow chamber comprises a first opening and a second opening, wherein the first opening and the second opening are respectively located at two opposite ends of the hollow chamber, the first opening is located near the keycap, and the second opening is located near the switch circuit.

6. The transparent key module according to claim 5, wherein the switch circuit comprises:
  an upper membrane layer comprising a top surface, plural light-transmissible openings and a bottom surface, wherein the plural light-transmissible openings of the upper membrane layer run through the top surface of the upper membrane layer and the bottom surface of the upper membrane layer;
  a lower membrane layer comprising a top surface, plural light-transmissible openings and a bottom surface, wherein the plural light-transmissible openings of the lower membrane layer run through the top surface of the lower membrane layer and the bottom surface of the lower membrane layer, the bottom surface of the upper membrane layer faces the lower membrane layer, and the top surface of the lower membrane layer faces the upper membrane layer; and
  a spacer structure arranged between the bottom surface of the upper membrane layer and the top surface of the lower membrane layer, wherein the upper membrane layer and the lower membrane layer are separated from each other by the spacer structure,
  wherein at least one first circuit contact point is formed on the bottom surface of the upper membrane layer, at least one second circuit contact point is formed on the top surface of the lower membrane layer, the at least one first circuit contact point on the upper membrane layer and the at least one second circuit contact point on the lower membrane layer are overlapped with each other along a vertical direction, the at least one first circuit contact point on the upper membrane layer and the at least one second circuit contact point on the lower membrane layer are separated from each other by the spacer structure, the at least one first circuit contact point on the upper membrane layer is located near at least one of the plural light-transmissible openings of the upper membrane layer, and the at least one second circuit contact point on the lower membrane layer is located near at least one of the plural light-transmissible openings of the lower membrane layer,
  wherein a size of each of the plural light-transmissible openings of the upper membrane layer is smaller than a size of the second opening of the crater-shaped structure, and a size of each of the plural light-transmissible openings of the lower membrane layer is smaller than the size of the second opening of the crater-shaped structure,
  wherein while one of the plural keycaps is pressed down, the support part of the elastic member or the keycap is penetrated downwardly through the second opening of the crater-shaped structure to press the upper membrane layer, so that the first circuit contact point on the upper membrane layer is contacted with the second circuit contact point on the lower membrane layer.

7. The transparent key module according to claim 6, wherein the base plate comprises a top surface, at least one light-transmissible opening and a bottom surface, wherein the top surface of the base plate faces the lower membrane layer, the at least one light-transmissible opening of the base plate runs through the top surface of the base plate and the bottom surface of the base plate, a size of the at least one light-transmissible opening of the base plate is smaller than or equal to the size each of the plural light-transmissible openings of the lower membrane layer, and the at least one light-transmissible opening of the base plate is aligned with at least one of the light-transmissible openings of the lower membrane layer along the vertical direction, wherein when the first circuit contact point on the upper membrane layer is contacted with the second circuit contact point on the lower membrane layer, the lower membrane layer is supported by the top surface of the base plate.

8. The transparent key module according to claim 1, wherein the transparent key module further comprises a top cover, wherein the top cover is located over the connecting region of the lower part of the elastic member, and the top cover comprises a connecting frame and plural perforations, wherein the plural perforations are respectively aligned with the plural keycaps, and the plural keycaps are exposed outside the perforations, wherein the connecting frame comprises a top surface and a bottom surface, and the plural perforations run through the top surface of the connecting frame and the bottom surface of the connecting frame, wherein the top cover further comprises at least one protrusion post, and the at least one protrusion post is protruded downwardly from the bottom surface of the connecting frame.

9. The transparent key module according to claim 8, wherein the connecting region of the elastic member comprises at least one positioning hole, and the switch circuit comprises:
  an upper membrane layer comprising a top surface, at least one second positioning hole and a bottom surface, wherein the at least one second positioning hole of the upper membrane layer runs through the top surface of the upper membrane layer and the bottom surface of the upper membrane layer;
  a lower membrane layer comprising a top surface, at least one second positioning hole and a bottom surface, wherein the at least one second positioning hole of the lower membrane layer runs through the top surface of the lower membrane layer and the bottom surface of the lower membrane layer, the bottom surface of the upper membrane layer faces the lower membrane layer, and the top surface of the lower membrane layer faces the upper membrane layer; and
  a spacer structure arranged between the bottom surface of the upper membrane layer and the top surface of the lower membrane layer, wherein the upper membrane layer and the lower membrane layer are separated from each other by the spacer structure,
  wherein the base plate comprises a top surface, at least one positioning hole and a bottom surface, wherein the top surface of the base plate faces the lower membrane layer, and the at least one positioning hole of the base plate runs through the top surface of the base plate and the bottom surface of the base plate, wherein after the at least one protrusion post of the top cover is downwardly penetrated through the at least one positioning hole of the connecting region of the elastic member, the at least one second positioning hole of the upper membrane layer and the at least one second positioning hole of the lower membrane layer sequentially, the at least one protrusion post is inserted into the at least one positioning hole of the base plate, so that the elastic member and the switch circuit are clamped between the top cover and the base plate.

10. The transparent key module according to claim 9, wherein after the at least one protrusion post of the top cover is inserted into the positioning hole of the base plate, a sealing glue is formed around the protrusion post.

11. The transparent key module according to claim 9, wherein after the at least one protrusion post of the top cover is inserted into the positioning hole of the base plate, a riveting head is formed at an end of the protrusion post through a riveting process.

12. A transparent key module, comprising:
plural keycaps;
an elastic member comprising plural support parts, plural lateral parts and a lower part, wherein each of the plural support parts is connected with a keycap of the plural keycaps, each of the plural lateral parts is arranged between a support part of the plural support parts and the lower part, the lower part comprises a connecting region and a periphery region, the plural lateral parts are installed on the connecting region of the lower part, the periphery region is arranged around the connecting region, and the periphery region of the lower part comprises at least one positioning recess;
a contact point layer located under the elastic member;
a switch circuit located under the contact point layer; and
a base plate located under the switch circuit, and comprising at least one hook, wherein the at least one hook is penetrated upwardly through the switch circuit and the contact point layer and inserted into the at least one positioning recess, so that the contact point layer and the switch circuit are fixed between the elastic member and the base plate.

13. The transparent key module according to claim 12, wherein the contact point layer comprises a top surface, at least one first positioning hole, a bottom surface and at least one bump structure, wherein the at least one bump structure of the contact point layer is formed on the top surface of the contact point layer, and the at least one positioning hole of the contact point layer runs through the top surface of the contact point layer and the bottom surface of the contact point layer, wherein the switch circuit comprises:
an upper membrane layer comprising a top surface, at least one first positioning hole and a bottom surface, wherein the at least one first positioning hole of the upper membrane layer runs through the top surface of the upper membrane layer and the bottom surface of the upper membrane layer, and the bottom surface of the contact point layer faces the upper membrane layer;
a lower membrane layer comprising a top surface, at least one first positioning hole and a bottom surface, wherein the at least one first positioning hole runs through the top surface of the lower membrane layer and the bottom surface of the lower membrane layer, the bottom surface of the upper membrane layer faces the lower membrane layer, and the top surface of the lower membrane layer faces the upper membrane layer; and
a spacer structure arranged between the bottom surface of the upper membrane layer and the top surface of the lower membrane layer, wherein the upper membrane layer and the lower membrane layer are separated from each other by the spacer structure, wherein after the at least one hook of the base plate is penetrated upwardly through the at least one first positioning hole of the lower membrane layer, the at least one first positioning hole of the upper membrane layer and the at least one first positioning hole of the contact point layer sequentially, the at least one hook is inserted into the positioning recess.

14. The transparent key module according to claim 12, wherein the at least one positioning recess includes two positioning recesses, and the two positioning recesses are respectively located at two opposite sides of the periphery region of the elastic member, wherein the at least one hook includes two hooks, and the two hooks are respectively located at two opposite sides of the base plate, wherein the contact point layer comprises a top surface, two first positioning holes, a bottom surface and at least one bump structure, wherein the at least one bump structure of the contact point layer is formed on the top surface of the contact point layer, the two first positioning holes of the contact point layer run through the top surface of the contact point layer and the bottom surface of the contact point layer, and the switch circuit comprises:
an upper membrane layer comprising a top surface, two first positioning holes and a bottom surface, wherein the two first positioning holes of the upper membrane layer run through the top surface of the upper membrane layer and the bottom surface of the upper membrane layer, and the bottom surface of the contact point layer faces the upper membrane layer;
a lower membrane layer comprising a top surface, two first positioning holes and a bottom surface, wherein the two first positioning holes of the lower membrane layer run through the top surface of the lower membrane layer and the bottom surface of the lower membrane layer, the bottom surface of the upper membrane layer faces the lower membrane layer, and the top surface of the lower membrane layer faces the upper membrane layer; and
a spacer structure arranged between the bottom surface of the upper membrane layer and the top surface of the lower membrane layer, wherein the upper membrane layer and the lower membrane layer are separated from each other by the spacer structure,
wherein after the two hooks of the base plate are respectively penetrated upwardly through the two first positioning holes of the lower membrane layer, the two first positioning holes of the upper membrane layer and the two first positioning holes of the contact point layer sequentially, the two hooks are inserted into the positioning recesses.

15. The transparent key module according to claim 12, wherein from a top to bottom, each of the plural support parts, the plural lateral parts and the lower part in the elastic member are collaboratively formed as a crater-shaped structure, wherein a central portion of the crater-shaped structure has a hollow chamber, and the hollow chamber comprises a first opening and a second opening, wherein the first opening and the second opening are respectively located at two opposite ends of the hollow chamber, the first opening is located near the keycap, and the second opening is located near the contact point layer.

16. The transparent key module according to claim 15, wherein the contact point layer comprises a top surface, plural light-transmissible openings, a bottom surface and at least one bump structure, wherein the at least one bump structure of the contact point layer is formed on the top surface of the contact point layer, the at least one bump structure of the contact point layer is located near at least one of the plural light-transmissible openings of the contact point layer, and the plural light-transmissible openings of the contact point layer run through the top surface of the contact point layer and the bottom surface of the contact point layer, wherein the switch circuit comprises:
- an upper membrane layer comprising a top surface, plural light-transmissible openings and a bottom surface, wherein the plural light-transmissible openings of the upper membrane layer run through the top surface of the upper membrane layer and the bottom surface of the upper membrane layer, and the bottom surface of the contact point layer faces the upper membrane layer;
- a lower membrane layer comprising a top surface, plural light-transmissible openings and a bottom surface, wherein the plural light-transmissible openings of the lower membrane layer run through the top surface of the lower membrane layer and the bottom surface of the lower membrane layer, the bottom surface of the upper membrane layer faces the lower membrane layer, and the top surface of the lower membrane layer faces the upper membrane layer; and
- a spacer structure arranged between the bottom surface of the upper membrane layer and the top surface of the lower membrane layer, wherein the upper membrane layer and the lower membrane layer are separated from each other by the spacer structure,
- wherein at least one first circuit contact point is formed on the bottom surface of the upper membrane layer, at least one second circuit contact point is formed on the top surface of the lower membrane layer, the at least one first circuit contact point on the upper membrane layer and the second circuit contact point on the lower membrane layer are overlapped with each other along a vertical direction, the at least one first circuit contact point on the upper membrane layer and the second circuit contact point on the lower membrane layer are separated from each other by the spacer structure, the at least one first circuit contact point on the upper membrane layer is located near at least one of the plural light-transmissible openings of the upper membrane layer, and the at least one second circuit contact point on the lower membrane layer is located near at least one of the plural light-transmissible opening of the lower membrane layer,
- wherein a size of each of the plural light-transmissible openings of the upper membrane layer is smaller than a size of the second opening of the crater-shaped structure, and a size of each of the plural light-transmissible openings of the lower membrane layer is smaller than the size of the second opening of the crater-shaped structure,
- wherein while one of the plural keycaps is pressed down, the support part of the elastic member or the keycap is penetrated downwardly through the second opening of the crater-shaped structure to press the at least one bump structure of the contact point layer, and the upper membrane layer is pressed by the at least one bump structure of the contact point layer, so that the at least one first circuit contact point on the upper membrane layer is contacted with the at least one second circuit contact point on the lower membrane layer.

17. The transparent key module according to claim 16, wherein the base plate comprises a top surface, at least one light-transmissible opening and a bottom surface, wherein the top surface of the base plate faces the lower membrane layer, the at least one light-transmissible opening of the base plate runs through the top surface of the base plate and the bottom surface of the base plate, a size of the at least one light-transmissible opening of the base plate is smaller than or equal to the size of each of the plural light-transmissible openings of the lower membrane layer, and the at least one light-transmissible opening of the base plate is aligned with the light-transmissible opening of the lower membrane layer along the vertical direction, wherein when the first circuit contact point on the upper membrane layer is contacted with the second circuit contact point on the lower membrane layer, the lower membrane layer is supported by the top surface of the base plate.

18. The transparent key module according to claim 12, wherein the transparent key module further comprises a top cover, wherein the top cover is located over the connecting region of the lower part of the elastic member, and the top cover comprises a connecting frame and plural perforations, wherein the plural perforations are respectively aligned with the plural keycaps, and the plural keycap are exposed outside the perforations, wherein the connecting frame comprises a top surface and a bottom surface, and the plural perforations run through the top surface of the connecting frame and the bottom surface of the connecting frame, wherein the top cover further comprises at least one protrusion post, and the at least one protrusion post is protruded downwardly from the bottom surface of the connecting frame.

19. The transparent key module according to claim 18, wherein the connecting region of the elastic member comprises at least one positioning hole, and the contact point layer comprises a top surface, at least one second positioning holes, a bottom surface and at least one bump structure, wherein the at least one bump structure of the contact point layer is formed on the top surface of the contact point layer, the at least one second positioning hole of the contact point layer runs through the top surface of the contact point layer and the bottom surface of the contact point layer, and the switch circuit comprises:
- an upper membrane layer comprising a top surface, at least one second positioning hole and a bottom surface, wherein the at least one second positioning hole runs through the top surface of the upper membrane layer and the bottom surface of the upper membrane layer, and the bottom surface of the contact point layer faces the upper membrane layer;
- a lower membrane layer comprising a top surface, at least one second positioning hole and a bottom surface, wherein the at least one second positioning hole runs through the top surface of the lower membrane layer and the bottom surface of the lower membrane layer, the bottom surface of the upper membrane layer faces the lower membrane layer, and the top surface of the lower membrane layer faces the upper membrane layer; and
- a spacer structure arranged between the bottom surface of the upper membrane layer and the top surface of the lower membrane layer, wherein the upper membrane layer and the lower membrane layer are separated from each other by the spacer structure,
- wherein the base plate comprises a top surface, at least one positioning hole and a bottom surface, wherein the top surface of the base plate faces the lower membrane layer, the at least one positioning hole of the base plate runs through the top surface of the base plate and the bottom surface of the base plate, wherein after the at least one protrusion post of the top cover is downwardly penetrated through the at least one positioning hole of connecting region of the elastic member, the at least one second positioning hole of the contact point layer, the at least one second positioning hole of the upper membrane layer and the at least one second positioning hole of the lower membrane layer sequentially, the at least one protrusion post is inserted into the at least one positioning hole of the base plate, so that the elastic member, the contact point layer and the switch circuit are clamped between the top cover and the base plate.

20. The transparent key module according to claim 19, wherein after the at least one protrusion post of the top cover is inserted into the positioning hole of the base plate, a sealing glue is formed around the protrusion post.

21. The transparent key module according to claim 19, wherein after the at least one protrusion post of the top cover is inserted into the positioning hole of the base plate, a riveting head is formed at an end of the protrusion post through a riveting process.

\* \* \* \* \*